United States Patent
Shimizu et al.

(10) Patent No.: US 8,725,371 B2
(45) Date of Patent: May 13, 2014

(54) SPEED CHANGING CONTROL APPARATUS FOR VEHICLE

(75) Inventors: Masato Shimizu, Toyota (JP); Masato Tateno, Toyota (JP); Masayasu Mizobuchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 37 days.

(21) Appl. No.: 13/201,252

(22) PCT Filed: Mar. 5, 2009

(86) PCT No.: PCT/JP2009/054209
§ 371 (c)(1),
(2), (4) Date: Aug. 12, 2011

(87) PCT Pub. No.: WO2010/100747
PCT Pub. Date: Sep. 10, 2010

(65) Prior Publication Data
US 2011/0295475 A1      Dec. 1, 2011

(51) Int. Cl.
*G06F 17/00* (2006.01)

(52) U.S. Cl.
USPC .......... 701/66; 192/3.61; 192/48.8; 192/53.1; 477/80; 477/86; 477/115; 477/149; 477/156; 74/469

(58) Field of Classification Search
USPC ........... 192/3.61, 48.8, 53.1; 477/80, 86, 115, 477/149, 156; 74/469
See application file for complete search history.

(56) References Cited

U.S. PATENT DOCUMENTS

| 2003/0178278 A1* | 9/2003 | Shigyo ........................ 192/48.8 |
| 2003/0183032 A1 | 10/2003 | Shimaguchi |
| 2004/0192503 A1* | 9/2004 | Matsumura et al. .......... 477/156 |
| 2006/0047395 A1 | 3/2006 | Ikeya et al. |
| 2006/0249346 A1* | 11/2006 | Ebenhoch et al. ........... 192/53.1 |
| 2007/0012538 A1* | 1/2007 | Katakura et al. ............. 192/3.61 |

(Continued)

FOREIGN PATENT DOCUMENTS

| JP | 11 173349 | 6/1999 |
| JP | 2003 112541 | 4/2003 |

(Continued)

OTHER PUBLICATIONS

International Search Report issued May 26, 2009 in PCT/JP09/054209 filed Mar. 5, 2009.

*Primary Examiner* — Muhammad Shafi
*Assistant Examiner* — Sanjeev Malhotra
(74) *Attorney, Agent, or Firm* — Oblon, Spivak, McClelland, Maier & Neustadt, L.L.P.

(57) ABSTRACT

A speed changing control apparatus for use in a vehicle includes: a driving power source configured to generate driving power for running; a transmission having a synchromesh mechanism configured to synchronize an input shaft revolution number with an output shaft revolution number and an actuator configured to automatically carry out a shift operation; and an automatic clutch disposed between the driving power source and the transmission. The speed changing control apparatus is configured to start a shift disengaging operation for the transmission after a speed change is requested and before the automatic clutch turns into a decoupled state, so as to suppress torsional vibration at the time of decoupling the automatic clutch. Such control enables the synchromesh mechanism to carry out revolution synchronization with the input shaft revolution number of the transmission in a lowered state, and diminishes a revolution difference subjected to synchronization.

5 Claims, 16 Drawing Sheets

(56) References Cited

U.S. PATENT DOCUMENTS

| | | | |
|---|---|---|---|
| 2007/0254775 A1* | 11/2007 | Kishi | 477/115 |
| 2007/0266812 A1* | 11/2007 | Asada | 74/469 |
| 2008/0026910 A1* | 1/2008 | Honma et al. | 477/149 |
| 2008/0214348 A1* | 9/2008 | Hasegawa et al. | 475/80 |
| 2009/0042692 A1* | 2/2009 | Fujimoto et al. | 477/86 |

FOREIGN PATENT DOCUMENTS

| | | |
|---|---|---|
| JP | 2003 278907 | 10/2003 |
| JP | 2004 155387 | 6/2004 |
| JP | 2004 270811 | 9/2004 |
| JP | 2007 211945 | 8/2007 |
| JP | 2008 202684 | 9/2008 |

* cited by examiner (A) Clutch coupling (B) Clutch decoupling (torsion release)

(C) Swing-back

SPEED CHANGING CONTROL APPARATUS FOR VEHICLE

TECHNICAL FIELD

The present invention relates to a speed changing control apparatus of a vehicle that includes a driving power source such as an engine, a transmission, and an automatic clutch disposed along a driving power transmitting passage between the driving power source and the transmission.

BACKGROUND ART

In vehicles on which driving power sources such as engines (internal combustion engines) are mounted, as transmissions to appropriately transmit torque and revolution speed generated by the engines to drive wheels in accordance with vehicle running conditions, automatic transmissions are known to automatically optimize a speed change ratio between the engines and the drive wheels.

Examples of the automatic transmissions mounted on vehicles include a planetary gear type transmission that sets up a gear stage using a clutch, a brake, and a planetary gear apparatus; and a continuously variable transmission (CVT: Continuously Variable Transmission) of belt type that adjusts a speed change ratio steplessly.

Further, examples of transmissions mounted on vehicles include an automated manual transmission (hereafter also referred to as AMT) in which actuators automatically carry out a speed change operation (change-over of gear stages). Specifically, in a constant mesh gear type transmission that includes a plurality of gear pairs (input shaft side gears and output shaft side gears), a synchromesh mechanism is actuated and controlled by a shift actuator and a selection actuator so as to switch each gear pair between a power transmitting state and a no-power transmitting state, thereby obtaining a desired speed change ratio (for example, see PLT 1). For coupling the AMT to the driving power source such as an engine, an automatic clutch is employed.

The synchromesh mechanism of the constant mesh gear type transmission includes a sleeve and a synchronizer ring. The sleeve is coupled to either an input shaft or an output shaft of the transmission and is shifted in the shift direction by the shift actuator. When the sleeve is shifted from a neutral position to a shift engagement position (gear engagement position), the sleeve is engaged with one gear among a plurality of gears supported in an idling state on either the input shaft or the output shaft, whereby the gear is engaged to either the input shaft or the output shaft (gear engagement). With the engagement of the gear, one gear pair turns into a power transmitting state, thereby obtaining a gear stage corresponding to the gear pair. Subsequently, when the sleeve is shifted, from the state (gear engagement state) in which the sleeve is engaged with the gear, in a direction opposite to the direction at the time of the shift engagement, then the sleeve is disengaged from the gear. As a result, the gear turns into an idling state and the sleeve turns into a neutral state. This operation of disengaging the sleeve from the engagement state is referred to as shift disengagement (gear disengagement).

The synchronizer ring is configured to synchronize the input shaft with the output shaft of the transmission with a frictional force that increases in accordance with the movement of the sleeve. This ensures that even if the input shaft does not synchronize with the output shaft of the transmission before speed change, synchronization occurs with the movement of the sleeve during the speed change, resulting in a smooth speed change.

The automatic clutch includes a frictional clutch and a clutch operating apparatus that operates the clutch. The clutch operating apparatus includes, for example, a release bearing, a release fork, and a hydraulic actuator to actuate the release fork, and the clutch operating apparatus is configured to control oil pressure of the actuator to automatically turn the clutch into a decoupled state or a coupled state (engaged state).

PLT 2, listed below, discloses a speed changing control apparatus of a vehicle that includes a mechanical clutch disposed between an engine and a gear type transmission, wherein after gear disengagement, the clutch is moved from a decoupled position to a position just before a half clutch region at the same time with gear engagement to a required gear stage, and then upon completion of the gear engagement, the clutch is moved to a completely-coupled position.

PLT 3 discloses a speed changing control apparatus wherein in the speed change of a double clutch, movement is permitted only as far as a point, within a range where the driving power is not transmitted, that becomes as close as possible to a point where the transmitting of driving power is stated, at the time of disengagement of an automatic clutch.

PLT 4 discloses a control method by which engine output is controlled so that a vehicle acceleration is approximately zero when a speed change is requested, and the control of the engine output is maintained for a predetermined period of time and then a clutch is completely released.

PTL 1: JP2008-202684A
PTL 2: JP2007-211945A
PTL 3: JP2003-112541A
PTL 4: JP11-173349A

SUMMARY OF INVENTION

Technical Problem

In vehicles on which AMTs are mounted, in a usual up-shift speed change, after the automatic clutch is decoupled, the input shaft revolution number is synchronized with the output shaft revolution number of the transmission by the synchronizing action of a synchronizer ring of the synchromesh mechanism. In this respect, the input shaft revolution number of the transmission before synchronization is basically a revolution number that is lower than the revolution number before the speed change by a value equivalent to dragging.

Incidentally, if the decoupling operation for the automatic clutch is quickly carried out in an attempt to implement an up-shift speed change in a short period of time such as during acceleration, drive system components, such as a drive shaft and a torque tube, that have been twisted so far through running are rapidly released from torsion, causing torsional vibration on a driving system (input shaft system of the transmission). In particular, in cases of large torsional vibration, the input shaft revolution number of the transmission can rise to or beyond the revolution number before the speed change. Accordingly, the time necessary for speed change increases. This will be described below.

First, in the conventional shift control, as shown in FIG. 17, after an up-shift speed change is requested, a shift disengaging operation starts at a time to when an automatic clutch turns into a half clutch position (clutch-decoupled state). However, if the shift disengaging operation starts at such timing, torsional vibration causes a situation where the gears cannot be disengaged. That is, if torsional vibration occurs, the engaging force between the input shaft side gear and output shaft side gear of the transmission turns into an increased state, in which shift disengagement (sleeve disengagement of the synchromesh mechanism) cannot be carried out immediately. Consequently, a shift stroke stands still.

Subsequently, at a timing t2x shown in FIG. 17, the shift is disengaged, which results in a neutral state. Then, a shift engaging operation for a required gear stage starts, and at a timing t2y, synchronization by the synchronizer ring starts. At the time of start of the synchronization by the synchronizer ring, since the input shaft revolution number of the transmission is high due to torsional vibration, a revolution difference (revolution difference subjected to synchronization) for a synchronized revolution number after the speed change increases. This situation elongates the time necessary for revolution synchronization and increases the workload of the synchronizer ring, so that there is a possibility that abrasion and deterioration of the synchronizer ring improve. Such drawbacks are unknown matters. In this regard, although delaying the start time t2y of the synchronization by the synchronizer ring can diminish the revolution difference subjected to synchronization, in this case, the time necessary for the speed change becomes rather long.

The present invention is achieved in view of the above circumstances, and it is an object of the present invention to provide a speed changing control apparatus capable of shortening the time necessary for revolution synchronization at the time of a speed change in vehicles equipped with an ATM that includes a synchromesh mechanism configured to synchronize an input shaft revolution number with an output shaft revolution number and an actuator to automatically carry out a shift operation.

Solution to Problem

A speed changing control apparatus according to the present invention is applied to a vehicle that includes: a driving power source configured to generate driving power for running; a transmission including a synchromesh mechanism configured to synchronize an input shaft revolution number with an output shaft revolution number and an actuator configured to automatically carry out a shift operation; and an automatic clutch disposed along a driving power transmitting passage between the driving power source and the transmission. The speed changing control apparatus includes shift control means for starting a shift disengaging operation for the transmission after a speed change is requested and before the automatic clutch turns into a decoupled state. The speed changing control apparatus is configured to cause the synchromesh mechanism to carry out revolution synchronization after the shift disengagement ends with the input shaft revolution number of the transmission in a lowered state.

According to the present invention, torsional vibration caused by decoupling of the automatic clutch at the time of a speed change is suppressed. This will be described below.

First, if the automatic clutch is rapidly decoupled in accordance with a request of speed change (specifically, a request of an up-shift speed change) such as during acceleration, torsional vibration as shown in FIG. 15 occurs on an input shaft system of the transmission. In such torsional vibration, a vibrating force (that is, engaging power between the input shaft side gear and the output shaft gear in the transmission) increases during time periods between P1 and P2, between P2 and P3, and between P3 and P4, making shift disengagement difficult. However, the vibrating force becomes maximum at a peak and a bottom. From a peak toward a bottom, and from a bottom toward a peak, the vibrating force decreases, and becomes minimal at points P1, P2, P3, and P4, where the direction of torsion is reversed. In other words, at points P1, P2, P3, and P4, the input shaft side torque of the transmission and the output shaft side torque of the transmission turn into a mutually balanced state. This ensures that shift disengagement is carried out at points P1, P2, P3, and P4.

With an attention focused on this point, in the present invention, after a speed change is requested, a shift disengaging operation is controlled to start so as to ensure shift disengagement at first point P1. Specifically, the shift disengaging operation starts at a timing after a speed change is requested and before the automatic clutch turns into a decoupled state (half clutch position) so as to apply a force (shift disengaging force) for shift disengagement onto the sleeve of the synchromesh mechanism before the input shaft revolution number reaches point P1 shown in FIG. 15. As a result, the shift is disengaged naturally upon the input shaft revolution number reaching point P1 after the automatic clutch turns into a decoupled state, that is, upon establishment of a balance between the input shaft side torque of the transmission and the output shaft side torque of the transmission.

Establishing a disengagement state at point P1 (immediately after releasing of torsion) in this manner ensures that both end portions of the input shaft system of the transmission immediately become free ends, thereby suppressing torsional vibration. Accordingly, the input shaft revolution number of the transmission decreases, instead of rising, due to dragging, and becomes close to the synchronized revolution number after the speed change. This diminishes the revolution difference (revolution difference subjected to synchronization) between the input shaft revolution number and the output shaft revolution number, and shortens the time necessary for revolution synchronization. As a result, the time necessary for the speed change is shortened. Further, the workload of the synchronizer ring per speed change is reduced, thereby reducing abrasion and deterioration of the synchronizer ring.

A specific configuration of the present invention is to start the shift disengaging operation for the transmission upon elapse of a target period of time from a point of time when the speed change is requested. In this case, the target period of time used for judgment of the start of the shift disengaging operation is set at a suitable value, in consideration of variation in responsiveness of shift control, machine-to-machine variations, and the like, in such a manner that a shift disengaging force securely acts on the sleeve when the input shaft revolution number reaches point P1 shown in FIG. 15, even in a situation that the variations would become largest.

Another specific configuration of the present invention is to dispose actual stroke detecting means for detecting a clutch stroke of the automatic clutch, and to start the shift disengaging operation upon the actual clutch stroke reaching a target clutch stroke position after the speed change is requested and before the automatic clutch turns into a decoupled state. In this case, the target clutch stroke position is set at a suitable value, in consideration of variation in responsiveness of shift control and machine-to-machine variations, such that a shift disengaging force securely acts on the sleeve when the input shaft revolution number reaches point P1 shown in FIG. 15.

In this case, it is possible to: calculate a period of time during which the actual clutch stroke reaches the target clutch stroke position (specifically, a period of time during which the clutch stroke reaches the target clutch stroke position from the decoupled position of the clutch), based on an amount of change per unit time in the clutch stroke of the automatic clutch after the speed change is requested; and start the shift disengaging operation upon elapse of the calculated period of time from a point of time when the actual stroke changes after a clutch decoupling request is initiated.

Advantageous Effects of Invention

According to the present invention, a shift disengaging operation for the transmission starts after a speed change is requested and before the automatic clutch turns into a decoupled state, thereby suppressing torsional vibration. This shortens the time necessary for revolution synchronization at the time of a speed change. This shortens the time necessary for speed change. Further, abrasion and deterioration of the synchronizer ring are reduced.

REFERENCE SIGNS LIST

Figure 1:
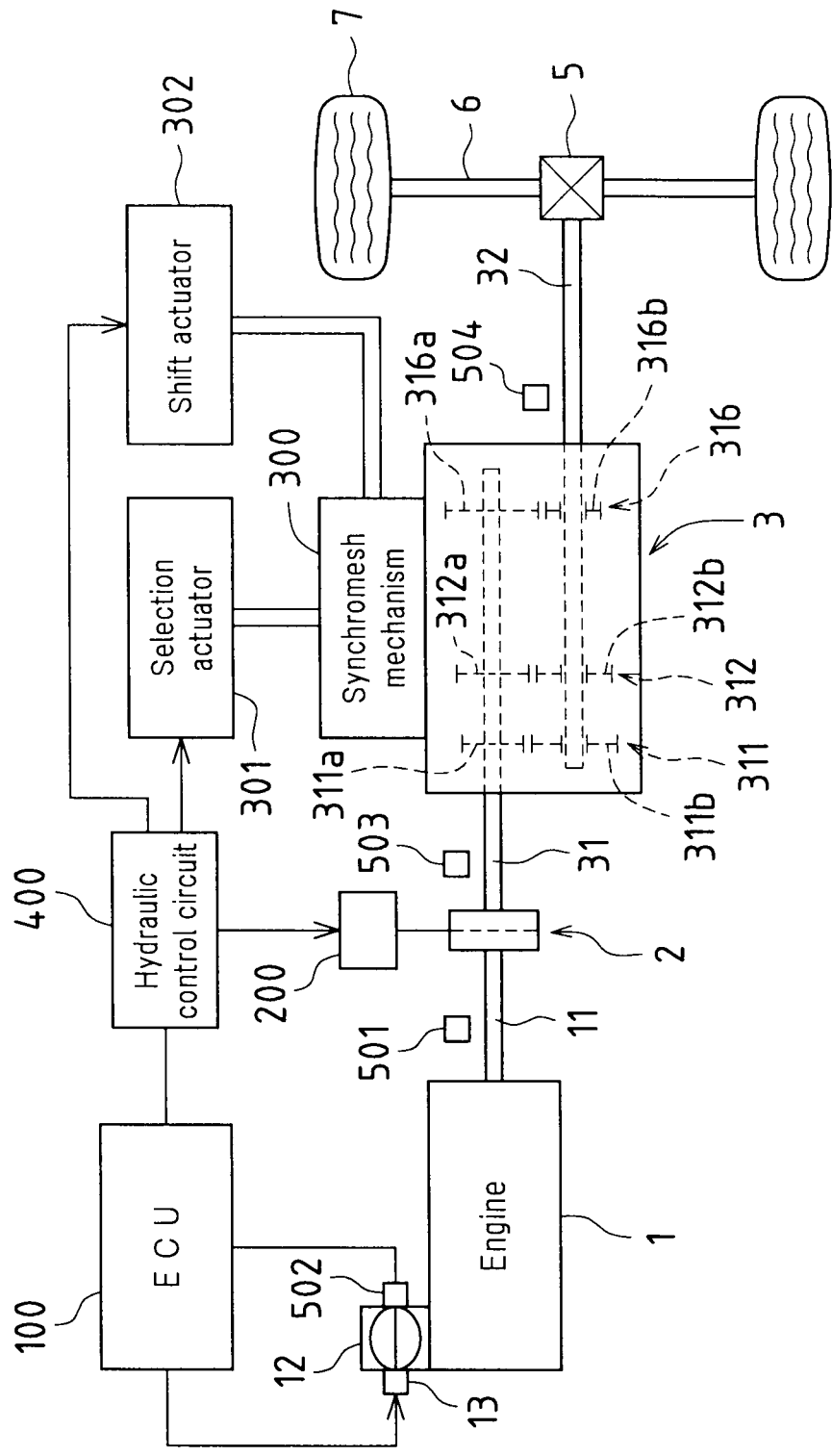
FIG. 1 is a schematic diagram showing an example of a vehicle to which the present invention is applied.

1 Engine
2 Automatic clutch
203 Clutch actuator
3 Transmission
300 Synchromesh mechanism
320 Sleeve
330 Synchronizer ring
301 Selection actuator
302 Shift actuator
400 Hydraulic control circuit
100 ECU
503 Input shaft revolution number sensor
504 Output shaft revolution number sensor
508 Selection stroke sensor
509 Shift stroke sensor
510 Clutch stroke sensor

DESCRIPTION OF EMBODIMENTS

Embodiments of the present invention will be described below by referring to the drawings.

Referring to FIG. 1, a vehicle to which the present invention is applied will be described.

On the vehicle in this embodiment, an engine 1, an automatic clutch 2, a transmission 3, a selection actuator 301, a shift actuator 302, a hydraulic control circuit 400, and an ECU (Electronic Control Unit) 100 are mounted. Description will be given below by referring to the engine 1, the automatic clutch 2, the transmission 3, the selection actuator 301, the shift actuator 302, the hydraulic control circuit 400, and the ECU 100.

—Engine—

A crankshaft 11 is an output shaft of the engine 1 and coupled to a flywheel 21 (FIG. 2) of the automatic clutch 2. The revolution number (the number of engine revolutions) of the crankshaft 11 is detected by an engine revolution number sensor 501.

The amount of air to be introduced into the engine 1 is adjusted by an electronically-controlled throttle valve 12. The throttle valve 12 is able to electronically control a throttle opening independently of an accelerator operation of a driver, and the degree of opening (throttle opening) is detected by a throttle opening degree sensor 502.

The throttle opening of the throttle valve 12 is actuated and controlled by the ECU 100. Specifically, the throttle opening of the throttle valve 12 is controlled so as to obtain an optimum amount of intake air (target intake air quantity) corresponding to working conditions of the engine 1, such as an engine revolution number detected by the engine revolution number sensor 501 and the amount of a driver's pressing of an accelerator pedal (accelerator opening). More specifically, the actual throttle opening of the throttle valve 12 is detected by the throttle opening degree sensor 502. Then, a throttle motor 13 is subjected to feed-back control so as to conform the detected actual throttle opening to a throttle opening (target throttle opening) at which the target intake air quantity is obtained.

—Automatic Clutch—

A specific configuration of the automatic clutch 2 will be described by referring to FIG. 2.

The automatic clutch 2 of this embodiment includes a dry single plate friction clutch 20 (hereafter simply referred to as "clutch 20") and a clutch operation apparatus 200.

The clutch 20 includes a flywheel 21, a clutch disc 22, a pressure plate 23, a diaphragm spring 24, and a clutch cover 25.

The flywheel 21 is attached to the crankshaft 11. The clutch cover 25 is attached to the flywheel 21 so as to be rotatable integrally with the flywheel 21. The clutch disc 22 is fixed to an input shaft 31 of the transmission 3 by spline engagement. The clutch disc 22 is arranged opposite to the flywheel 21.

The pressure plate 23 is arranged between the clutch disc 22 and the clutch cover 25. The pressure plate 23 is pressed toward the flywheel 21 side by the outer peripheral portion of the diaphragm spring 24. The pressing force applied on the pressure plate 23 causes a friction force between the clutch disc 22 and the pressure plate 23 and another friction force between the flywheel 21 and the clutch disc 22. These friction forces turn the clutch 20 into a coupled (engaged) state, so that the flywheel 21, the clutch disc 22, and the pressure plate 23 rotate integrally.

Thus, the coupled state of the clutch 20 allows driving power to be transmitted from the engine 1 to the transmission 3. With the transmitted driving power, torque that is referred to as "clutch torque" is transmitted from the engine 1 to the transmission 3 via the clutch 20. The clutch torque is approximately "0" with the clutch 20 in the decoupled state. The clutch torque increases as the clutch 20 gradually proceeds to coupling and the slippage of the clutch disc 22 decreases. Finally, with the clutch 20 in a completely coupled state, the clutch torque conforms to the revolution torque of the crankshaft 11.

The clutch operation apparatus 200 includes a release bearing 201, a release fork 202, and a hydraulic clutch actuator 203. The clutch operation apparatus 200 axially moves the pressure plate 23 of the clutch 20 so as to set the clutch disc 22 between a strongly-nipped state between and a separated state away from the pressure plate 23 and the flywheel 21.

The release bearing 201 is axially movably fitted on the input shaft 31 of the transmission 3 and is in contact with a center portion of the diaphragm spring 24.

The release fork 202 is a member to move the release bearing 201 toward the flywheel 21 side. The clutch actuator 203 includes a cylinder having an oil chamber 203a and a piston rod 203b, and reciprocates the piston rod 203b (back-and-forth motion) so as to rotate the release fork 202 about a fulcrum point 202a functioning as a center of rotation.

The actuation of the clutch actuator 203 is controlled by the hydraulic control circuit 400 and the ECU 100. Specifically, when the clutch actuator 203 in the state (clutch-coupled state) shown in FIG. 2 is driven to move the piston rod 203b forward, then the release fork 202 is rotated (rotated in the clockwise direction in FIG. 2), and with this rotation, the release bearing 201 is moved toward the flywheel 21 side. Thus, with the movement of the release bearing 201, the central portion of the diaphragm spring 24, that is, the portion of the diaphragm spring 24 in contact with the release bearing 201, is moved toward the flywheel 21 side (i.e., the diaphragm spring 24 is reversed). Accordingly, the pressing force applied onto the pressure plate 23 by the diaphragm spring 24 becomes weak, so that the friction forces decrease. As a result, the clutch 20 is turned into a decoupled state (released state).

Meanwhile, when, in the clutch-decoupled state, the piston rod 203b of the clutch actuator 203 is moved backward, the pressure plate 23 is pressed toward the flywheel 21 side by the elastic force of the diaphragm spring 24. The pressing of the pressure plate 23 causes a friction force between the clutch disc 22 and the pressure plate 23 and another friction force between the flywheel 21 and the clutch disc 22, and these friction forces turn the clutch 20 into a coupled (engaged) state.

—Transmission—

Next, the transmission 3 will be described by referring to FIG. 1.

The transmission 3 has a similar configuration to a common manual transmission, such as a parallel gear type transmission with six stages at the forward side and one stage at the backward side.

The transmission 3 of this embodiment is a staged transmission of constant mesh gear type that includes a synchromesh mechanism 300. The transmission 3 includes an input shaft 31, an output shaft 32, and six gear pairs 311, 312, . . . , and 316 disposed on the input shaft 31 and the output shaft 32 and having different speed reduction ratios. Selection of one of the gear pairs 311, 312, . . . , and 316 realizes a power transmitting state, in which the speed change ratios of the six stages at the forward side are set. It should be noted that FIG. 1 schematically shows only three sets of a gear pair 311 (a gear 311a and a gear 311b), a gear pair 312 (a gear 312a and a gear 312b), and a gear pair 316 (a gear 316a and a gear 316b).

The one-side (input shaft side) gears 311a, 312a, . . . , and 316a, which respectively constitute the gear pairs 311, 312, . . . , and 316, are supported on the input shaft 31 of the transmission 3 so as to be rotated integrally with the input shaft 31 or to idle. Meanwhile, the other-side (output shaft side) gears 311b, 312b, . . . , and 316b are supported on the output shaft 32 so as to be rotated integrally with the output shaft 32 or to idle. In this embodiment, the input shaft side gears 311a, 312a, . . . , and 316a are supported to be rotated integrally with the input shaft 31, while the output shaft side gears 311b, 312b, . . . , and 316b are supported so as to idle on the output shaft 32.

In the gear pairs 311, 312, . . . , and 316, the gears 311a, 312a, . . . , and 316a are arranged so as to be constantly meshed with the corresponding gears 311b, 312b, . . . , and 316b. When the output shaft side gear of one gear pair among the gear pairs 311, 312, . . . , and 316, for example, the output shaft side gear 312b of the gear pair 312 is connected to the output shaft 32 via a synchromesh mechanism 300, described later, then the gear pair 312 turns into a power transmitting state. This ensures that a gear stage (for example, the second speed (2nd)) corresponding to the gear pair 312 is obtained. Similarly, when the input shaft side gear 316a of the gear pair 316 is connected to the output shaft 32 via the synchromesh mechanism 300, the gear pair 316 turns into a power transmitting state, ensuring that a gear stage (for example, the sixth speed (6th)) corresponding to the gear pair 316 is obtained. In this regard, for example, a backward gear pair, not shown, is disposed on the input shaft 31 of the transmission 3, and the backward gear pair is meshed with an idle gear disposed on a counter shaft, whereby a backward gear stage is set.

Figure 2:
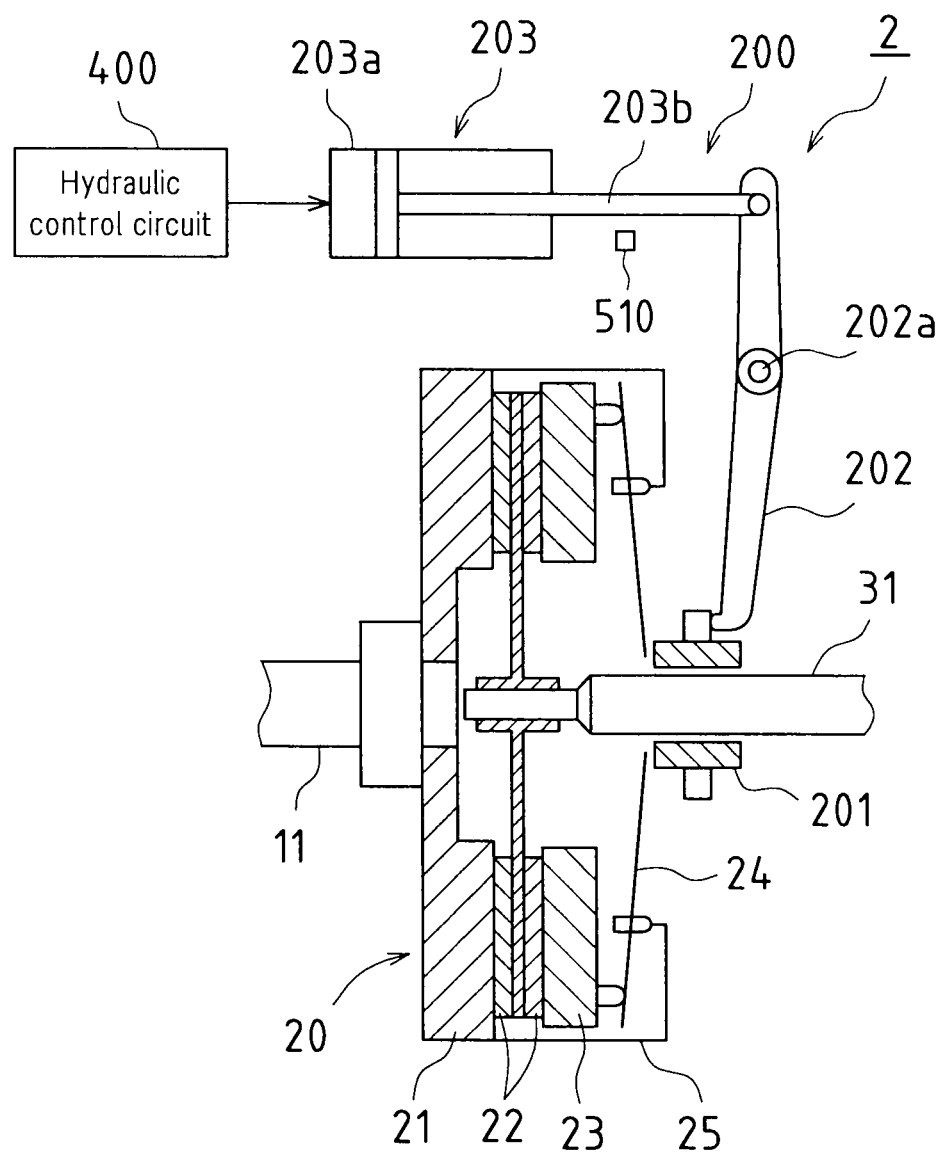
FIG. 2 is a cross-sectional view of an automatic clutch schematically illustrating a configuration thereof.

The input shaft 31 of the transmission 3 is connected to the clutch disc 22 of the clutch 20 (see FIG. 2). Further, as shown in FIG. 1, the revolution of the output shaft 32 of the transmission 3 is transmitted to drive wheels 7 through a differential gear 5, a shaft 6, and the like.

The revolution number of the input shaft 31 of the transmission 3 (the output shaft side revolution number of the clutch 20) is detected by an input shaft revolution number sensor 503. Also, the revolution number of the output shaft 32 of the transmission 3 is detected by an output shaft revolution number sensor 504. Based on a ratio of revolution numbers (output revolution number/input revolution number) obtained from output signals of the input shaft revolution number sensor 503 and the output shaft revolution number sensor 504, a current gear stage of the transmission 3 is determined. Further, from the output signal of the output shaft revolution number sensor 504, a vehicle speed is calculated. The output signals from the input shaft revolution number sensor 503 and the output shaft revolution number sensor 504 are input to the ECU 100.

In this embodiment, a torque tube, not shown, is disposed in an input shaft system between the automatic clutch 2 and the input shaft 31 of the transmission 3. The present invention can be applied to vehicles without such torque tube.

—Synchromesh Mechanism—

Figure 3:
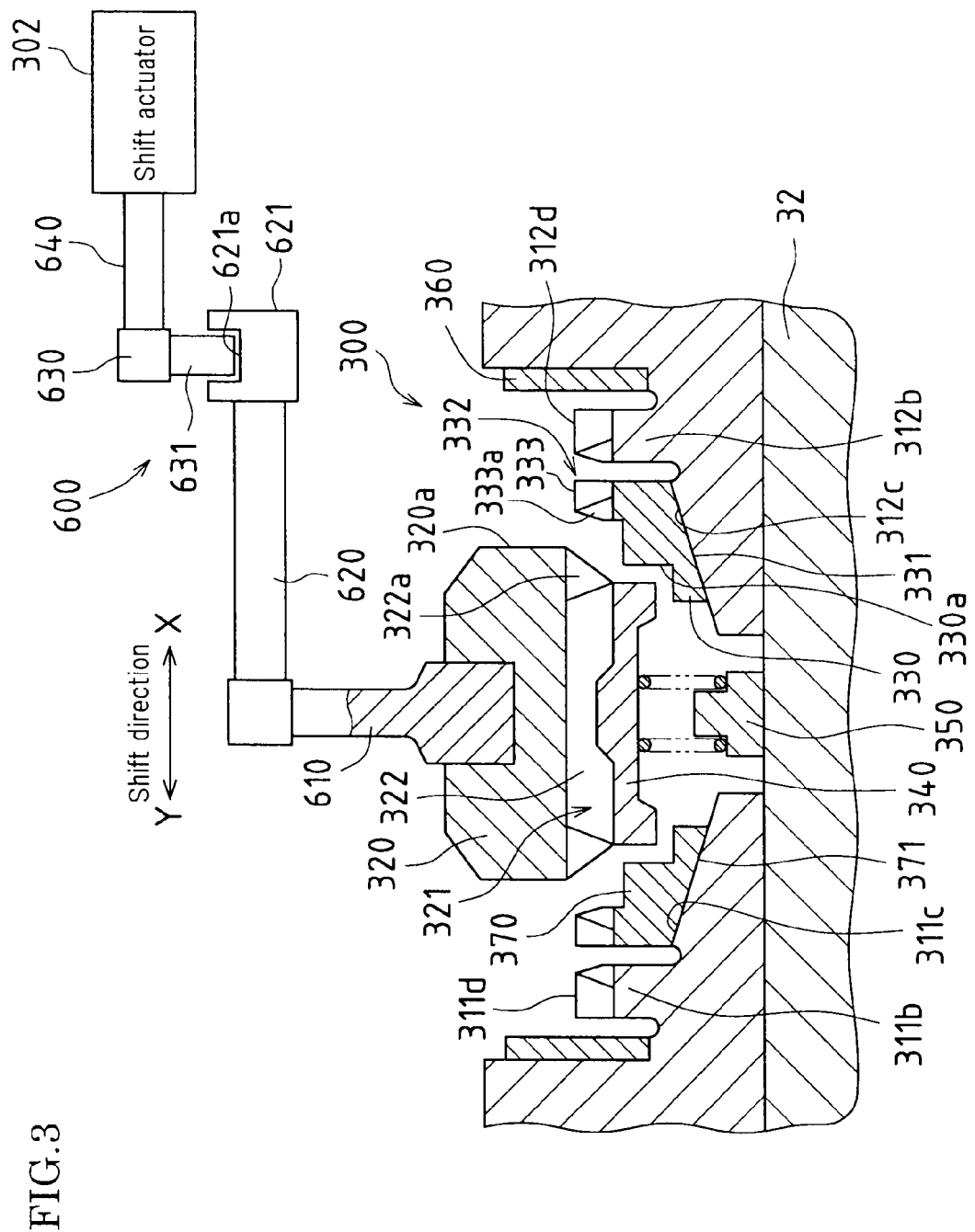
FIG. 3 shows a longitudinal cross-sectional view of principal portions of a synchromesh mechanism together with a schematic diagram of an actuating mechanism to actuate the synchromesh mechanism.
Figure 4:
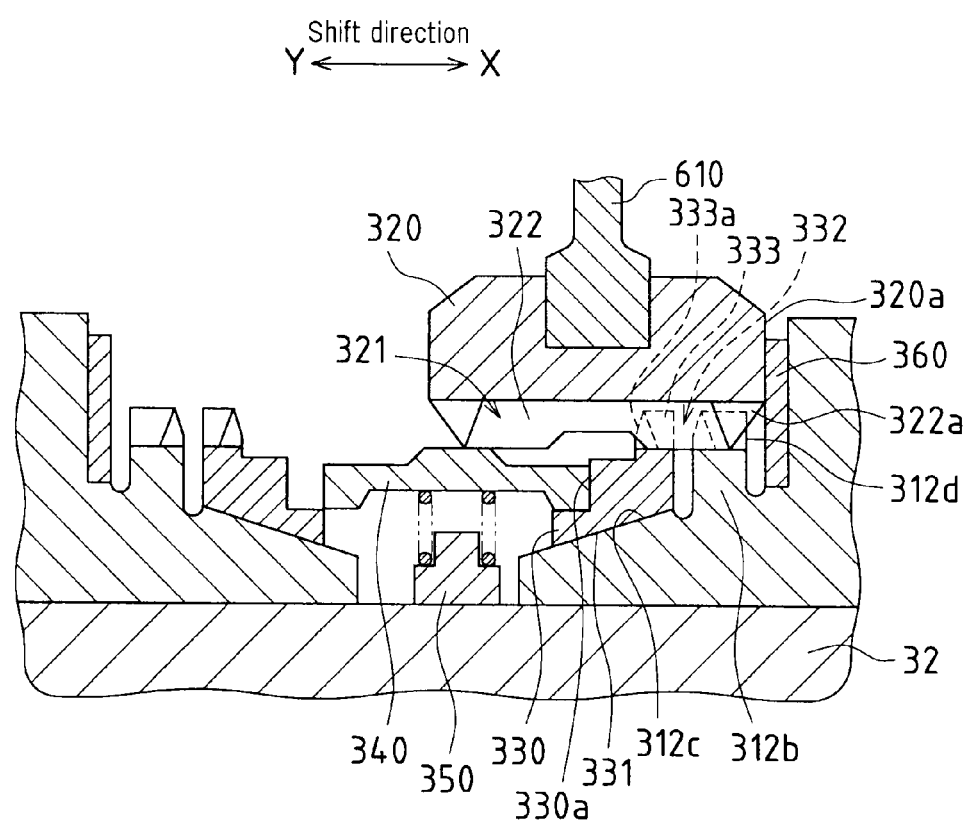
FIG. 4 is a longitudinal cross-sectional view of principal portions of the synchromesh mechanism.

Next, the synchromesh mechanism 300 of the transmission 3 will be described by referring to FIG. 3 and FIG. 4. Although FIG. 3 and FIG. 4 show only the synchromesh mechanism 300 for the gear pair 311 and the gear pair 312, the synchromesh mechanisms for the other gear pairs have basically a similar configuration to the synchromesh mechanism 300. Accordingly, a detailed description will not be provided.

The synchromesh mechanism 300 of this embodiment includes a sleeve 320 engaged with a shift fork 610 of an actuating mechanism 600, described later, a synchronizer ring (SNR) 330, a shifting key 340, and a clutch hub 350.

The clutch hub 350 is fitted on the output shaft 32 of the transmission 3 via an inner circumference spline (not shown), and is rotated integrally with the output shaft 32. The sleeve 320 includes an inner circumference spline 321, and is engaged (not shown) with the outer circumference of the clutch hub 350 via the inner circumference spline 321. The sleeve 320 is shifted in the shift direction (the X direction or the Y direction) by the shift actuator 302.

The synchronizer ring 330 is a cone-shaped member, and is shifted, for example, in the X direction by the sleeve 320 to bring a cone-shaped surface 331 of the synchronizer ring 330 into contact with a cone-shaped surface 312c of the gear 312b that idles on the output shaft 32 at a revolution number synchronized with that of the input shaft 31. On the outer circumference of the synchronizer ring 330, an outer circumference spline 332 is formed having external teeth 333 to be meshed with internal teeth 322 of the inner circumference spline 321 of the sleeve 320. The shifting key 340 is engaged with the inner circumference surface of the sleeve 320 by spline engagement, and presses an end face 330a of the synchronizer ring 330 in the X direction at the early stage of the shift in, for example, the X direction.

Figure 5:
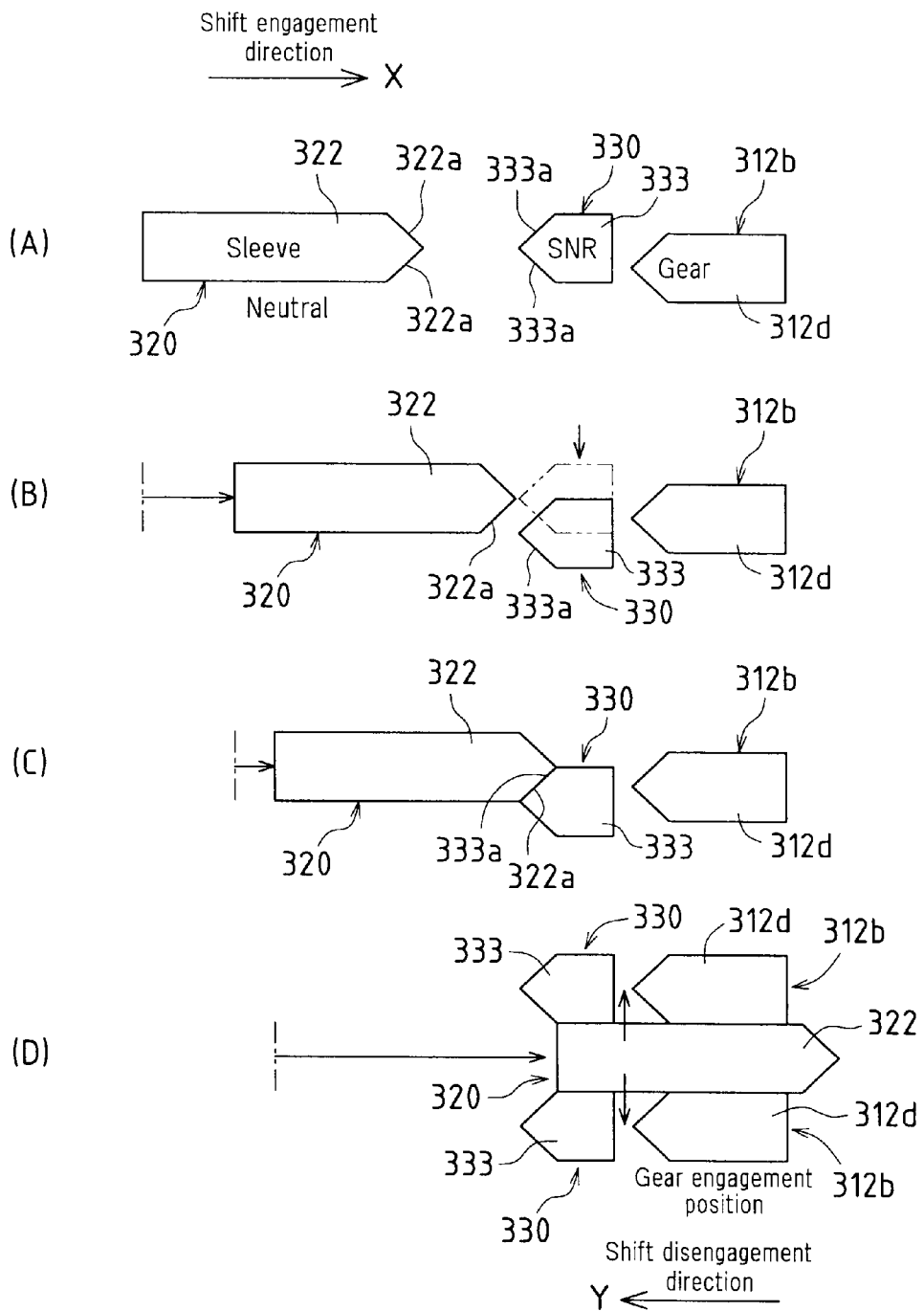
FIG. 5 is a diagram illustrating operations of the synchromesh mechanism.

The operation of the above synchromesh mechanism 300 will be described by referring to FIG. 3 to FIG. 5.

When the transmission 3 is in a neutral state, the sleeve 320 is held at a neutral position shown in FIG. 3 and FIG. 5(A). When the gear pair 312, for example, shown in FIG. 1 is turned into a power transmitting state from the above state, the sleeve 320 is shifted in the X direction shown in FIG. 3. With the shift of the sleeve 320, the shifting key 340 is also shifted in the X direction and presses the end face 330a of the synchronizer ring 330. In this respect, the shifting key 340 is positioned so as to rotate at a position displaced to one side of a groove (groove between the external teeth 333) of the outer circumference spline 332 of the synchronizer ring 330. Hence, as shown in FIG. 5(B), a chamfered surface (tapered surface) 322a of the internal teeth 322 of the sleeve 320 and a chamfered surface (tapered surface) 333a of the external teeth 333 of the synchronizer ring 330 are regulated in terms of phase so as to face one another constantly at mutually deviated phases.

This ensures that the sleeve 320 turns into a state capable of further shifting in the X direction. Accordingly, as shown in FIG. 5(C), the chamfered surface 322a of the sleeve 320 presses the chamfered surface 333a of the synchronizer ring 330, so that a large frictional force is generated between the cone-shaped surface 331 of the synchronizer ring 330 and the cone-shaped surface 312c of the gear 312b. Further, when each of the internal teeth 322 of the spline 321 of the sleeve 320 enters a corresponding groove (groove between the external teeth 333) of the outer circumference spline 332 of the synchronizer ring 330, the sleeve 320 presses directly the synchronizer ring 330 in the X direction, whereby the revolution of the gear 312b is synchronized with that of the synchronizer ring 330.

Upon completion of the synchronization, the synchronizer ring 330 turns into an idling state, and the sleeve 320 is further shifted in the X direction. Upon contact of the end surface 320a of the sleeve 320 with a stopper 360 (the state shown in FIG. 4), as shown in FIG. 5(D), each of the internal teeth 322 of the inner circumference spline 321 of the sleeve 320 enters between the external teeth 312d of the gear 312b (the internal teeth 322 of the inner circumference spline 321 are meshed with the external teeth 312d of the gear 312b). As a result, the gear 312b is connected to the output shaft 32, and the gear pair 312 (FIG. 1) turns into a power transmitting state, thus completing the speed change (gear engagement).

Next, when the state (gear engagement state) shown in FIG. 4 and FIG. 5(D) is returned to the neutral state, the sleeve 320 is shifted by the shift actuator 302 in the Y direction in FIG. 4 and FIG. 5(D). In the course of shift of the sleeve 320, the internal teeth 322 of the inner circumference spline 321 of the sleeve 320 are disengaged from the external teeth 312d of the gear 312b. Upon complete separation of the inner circumference spline 321 of the sleeve 320 from the outer circumference spline 332 of the gear 312b, the gear 312b turns into an idling state. Thereafter, upon shift of the sleeve 320 to the position shown in FIG. 3 and FIG. 5(A), the shift to the neutral state completes.

When the gear pair 311 (FIG. 1) is turned into a power transmitting state, the sleeve 320 is shifted in the Y direction shown in FIG. 3. Then, similarly to the case of the gear pair 312 described above, a cone-shaped surface 371 of a synchronizer ring 370 is pressed onto the cone-shaped surface 311c of the gear 311b so as to synchronize the revolution number of the gear 311b with that of the output shaft 32, and the internal teeth 322 of the inner circumference spline 321 of the sleeve 320 are meshed with the external teeth 311d of the gear 311b, whereby the gear 311b is connected to the output shaft 32. This turns the gear pair 311 (FIG. 1) into a power transmitting state, thus completing the speed change (gear engagement).

The above synchromesh mechanism 300 is actuated by the actuating mechanism that employs the selection actuator 301 and the shift actuator 302. The actuating mechanism will be described by referring to FIG. 3 and FIG. 6.

The actuating mechanism 600 of this embodiment includes a shift fork 610 linked with the sleeve 320 of the synchromesh mechanism 300, a shift fork shaft 620, a movable rod 630, a shift and selection shaft 640, and the above-described selection actuator 301 and shift actuator 302.

The shift fork shaft 620 is an elongatable member along the shift direction, and includes the shift fork 610 at one end (end portion at the sleeve 320 side of the synchromesh mechanism 300). At the other end of the shift fork shaft 620, a head 621 is disposed. On the head 621, an engagement groove 621a is formed for engagement with a lever extending along a selection direction.

The movable rod 630 is an elongatable member in the direction perpendicular to the shift fork shaft 620, i.e., in the selection direction. The movable rod 630 is connected to a piston rod 301c (see FIG. 7) of the selection actuator 301, so that the movable rod 630 is moved in the selection direction by the selection actuator 301. On a tip portion of the movable rod 630 (an end portion opposite to the selection actuator 301), a lever 631 is integrally disposed. The lever 631 is able to be inserted into the engagement groove 621a, which is disposed on the head 621 of the shift fork shaft 620.

The shift and selection shaft 640 is an elongatable member along the shift direction, and has one end linked with the movable rod 630. The other end of the shift and selection shaft 640 is connected to the piston rod 302c (see FIG. 7) of the shift actuator 302.

Figure 6:
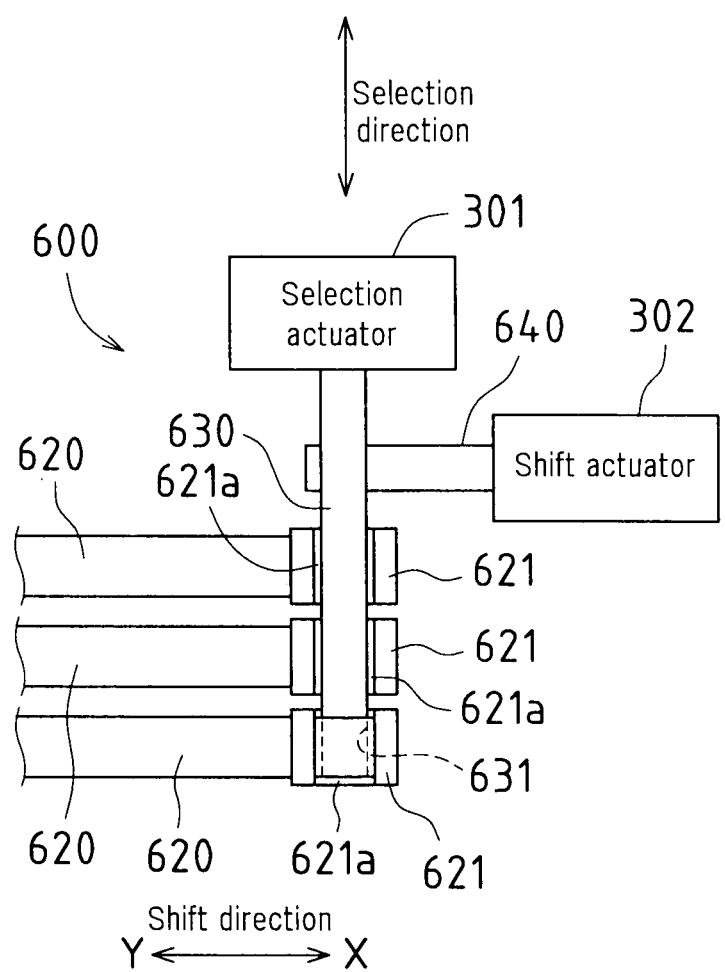
FIG. 6 is a plan view showing a part of an outline configuration of the actuating mechanism of FIG. 3.

In this embodiment, as shown in FIG. 6, the shift fork shafts 620 corresponding in number (three) to the synchromesh mechanisms are arranged in parallel, and the heads 621 are formed on the respective end portions of the shift fork shafts 620.

In the actuating mechanism 600 of this embodiment, the selection actuator 301 moves the movable rod 630 in the selection direction so as to selectively position the lever 631 at the tip portion of the movable rod 630 in the engagement groove 621a of the head 621 of any one of the three shift fork shafts 620.

For example, as shown in FIG. 6, with the lever 631 of the movable rod 630 positioned in the engagement groove 621a of the head 621 of the shift fork shaft 620 located furthest away from the selection actuator 301, when the shift and selection shaft 640 is moved (forward or backward) by the shift actuator 302, then the lever 631 is engaged first with the head 621. From this time point forward, with the movement of the shift and selection shaft 640, the shift fork shaft 620 and the shift fork 610 are moved. With this movement, the sleeve 320 of the synchromesh mechanism 300 is shifted in the shift direction. That is, with the actuation of the shift actuator 302, the sleeve 320 of the synchromesh mechanism 300 can be shifted to the neutral position or a shift engagement position (gear engagement position). Further, when another shift fork shaft 620 is selected by the actuation of the selection actuator 301, the sleeve of another synchromesh mechanism can be similarly shifted in the shift direction with the actuation of the shift actuator 302.

The actuation of each of the selection actuator 301 and the shift actuator 302 is controlled by the hydraulic control circuit 400 and the ECU 100.

In the actuating mechanism 600 of this embodiment, the synchromesh mechanism to carry out shift operation is selected by the selection actuator 301. However, each synchromesh mechanism (shift fork) may be equipped with one shift actuator. In this case, the select actuator may be omitted.

—Hydraulic Control Circuit—

Figure 7:
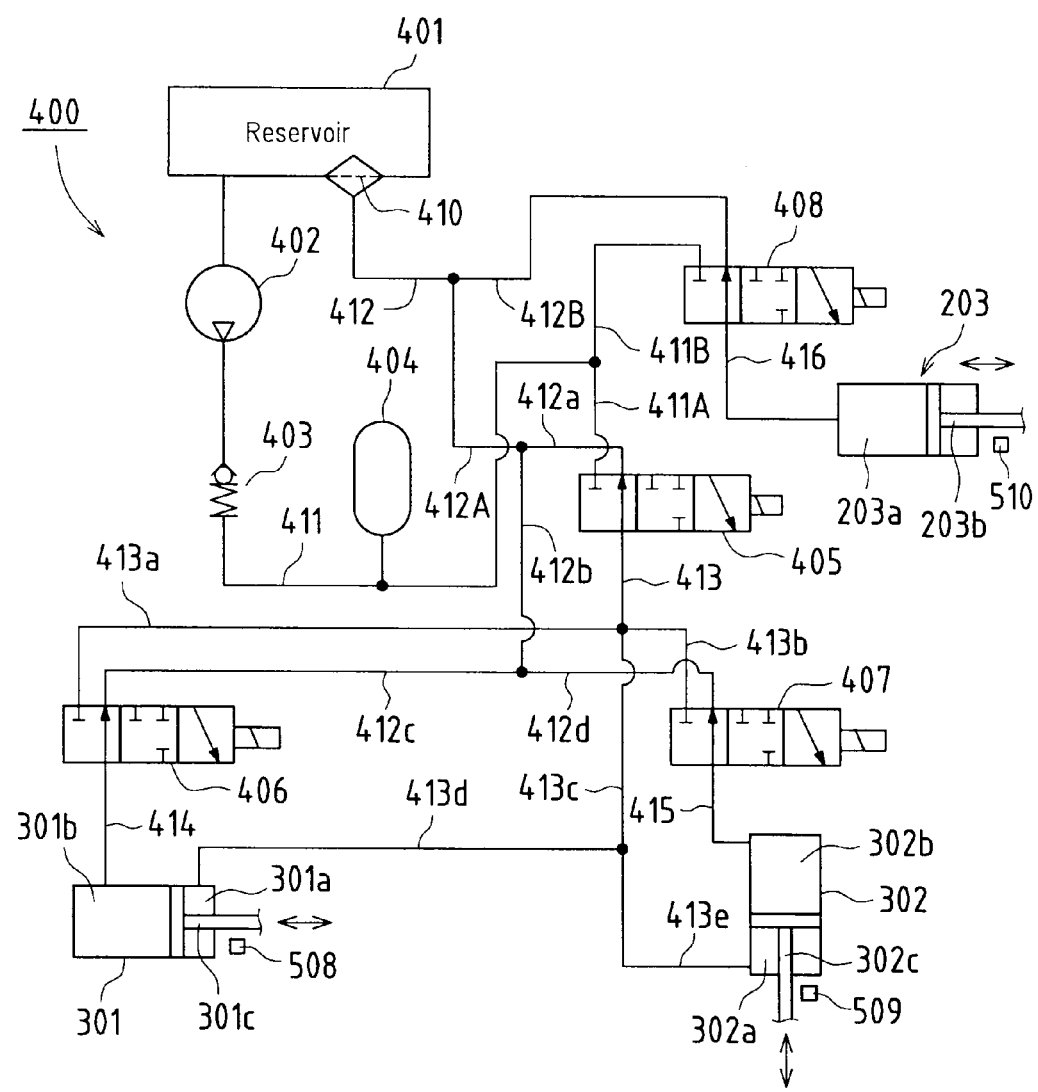
FIG. 7 is a circuit diagram of a hydraulic control circuit that controls oil pressure of each of a selection actuator, a shift actuator, and a clutch actuator.

Next, the hydraulic control circuit 400 will be described by referring to FIG. 7.

The hydraulic control circuit 400 of this embodiment includes a reservoir 401, an oil pump 402, a check valve 403, an accumulator 404, a master solenoid valve 405, a selection solenoid valve 406, a shift solenoid valve 407, a clutch solenoid valve 408, and an oil filter 410. The hydraulic control circuit 400 controls hydraulic oil to be supplied to the selection actuator (hydraulic cylinder) 301, the shift actuator (hydraulic cylinder) 302, and the clutch actuator (hydraulic cylinder) 203. As the oil pump 402, a mechanical oil pump driven by the actuation of an engine or an electric oil pump may be employed.

The reservoir 401 is connected with a hydraulic oil feed path 411 and a hydraulic oil circulation path 412, and an oil filter 410 is arranged at a communication part between the reservoir 401 and the hydraulic oil circulation path 412.

The hydraulic oil feed path 411 branches into two paths including a first branch oil path 411A connected to the master solenoid valve 405 and a second branch oil path 411B connected to the clutch solenoid valve 408.

The hydraulic oil circulation path 412 branches into two paths including a second branch oil path 412B connected to the clutch solenoid valve 408. The first branch path 412A of the hydraulic oil circulation path 412 further branches into two paths including a branch oil path 412a connected to the master solenoid valve 405. The other branch oil path 412b of the first branch oil path 412A further branches into two paths including a branch oil path 412c connected to the selection solenoid valve 406. The other branch oil path 412d is connected to the shift solenoid valve 407.

The master solenoid valve 405 is a change-over valve that selectively changes over to one position among (1) a position to connect the first branch oil path 411A of the hydraulic oil feed path 411 to a relay oil path 413 described later; (2) a position to connect the branch oil path 412a of the hydraulic oil circulation path 412 to the relay oil path 413; and (3) an oil path block position to block the first branch oil path 411A of the hydraulic oil feed path 411 and the branch oil path 412a of the hydraulic oil circulation path 412.

The relay oil path 413 is connected to the master solenoid valve 405. The relay oil path 413 branches into three paths including a first branch oil path 413a connected to the selection solenoid valve 406 and a second branch oil path 413b connected to the shift solenoid valve 407. A third branch oil path 413c of the relay oil path 413 further branches into two paths including a branch oil path 413d communicating with a first oil chamber 301a of the selection actuator 301. The other branch oil path 413e of the third branch oil path 413c communicates with a first oil chamber 302a of the shift actuator 302.

The selection solenoid valve 406 is connected with a communication oil path 414 that communicates with a second oil chamber 101b of the selection actuator 301. The selection solenoid valve 406 is a change-over valve that selectively changes over to one position among (1) a position to connect the first branch oil path 413a of the relay oil path 413 to the communication oil path 414; (2) a position to connect the third branch oil path 412c of the hydraulic oil circulation path 412 to the communication oil path 414; and (3) an oil path block position to block the first branch oil path 413a of the relay oil path 413 and the third branch oil path 412c of the hydraulic oil circulation path 412.

The shift solenoid valve 407 is connected with a communication oil path 415 that communicates with a second oil chamber 102b of the shift actuator 302. The shift solenoid valve 407 is a change-over valve that selectively changes over to one position among (1) a position to connect the second branch oil path 413b of the relay oil path 413 to the communication oil path 415; (2) a position to connect the branch oil path 412d of the hydraulic oil circulation path 412 to the communication oil path 415; and (3) an oil path block position to block the second branch oil path 413b and the branch oil path 412d.

The clutch solenoid valve 408 is connected with the second branch oil path 411B of the hydraulic oil feed path 411 and the second branch oil path 412B of the hydraulic oil circulation path 412. The clutch solenoid valve 408 is further connected with a communication oil path 416 that communicates with an oil chamber 203a of the clutch actuator 203. The clutch solenoid valve 408 is a change-over valve that selectively changes over to one position among (1) a position to connect the second branch oil path 411B of the hydraulic oil feed path 411 to the communication oil path 416; (2) a position to connect the second branch oil path 412B of the hydraulic oil circulation path 412 to the communication oil path 416; and (3) an oil path block position to block the second branch oil path 411B of the hydraulic oil feed path 411 and the second branch oil path 412B of the hydraulic oil circulation path 412.

The change-over operation for the master solenoid valve 405, the selection solenoid valve 406, the shift solenoid valve 407, and the clutch solenoid valve 408 is controlled by the ECU 100 (FIG. 1).

In the hydraulic control circuit 400, with oil pressure secured in the accumulator 404 and in such a state that the master solenoid valve 405 is changed over to connect the hydraulic oil feed path 411A to the relay oil path 413 (in the state that hydraulic oil stored in the reservoir 401 is supplied to the relay oil path 413 by the oil pump 402), when the selection solenoid valve 406 is changed over, the piston rod 301c of the selection actuator 301 is moved forward or backward in the selection direction. This implements the above-described selecting operation for the synchromesh mechanism 300 of the transmission 3. The travel distance (selection stroke) of the piston rod 301c of the selection actuator 301 is detected by a selection stroke sensor 508.

Further, if the shift solenoid valve 407 is changed over, the piston rod 302c of the shift actuator 302 is moved forward or backward in the shift direction. This implements a shift operation for the synchromesh mechanism 300 of the transmission 3. The travel distance (selection stroke) of the piston rod 301c of the shift actuator 302 is detected by a shift stroke sensor 509. The output signal of each of the shift stroke sensor 509 and the selection stroke sensor 508 is input to the ECU 100.

Meanwhile, when the clutch solenoid valve 408 is changed over to connect the second branch oil path 411B of the hydraulic oil feed path 411 to the communication oil path 416, the piston rod 203b of the clutch actuator 203 is moved forward, so that the automatic clutch 2 is released from a coupled state (the state shown in FIG. 2) and turns into a clutch-decoupled state. Further, when, in the clutch-decoupled state, the clutch solenoid valve 408 is changed over to connect the second branch oil path 412B of the hydraulic oil circulation path 412 to the communication oil path 416, hydraulic oil is discharged from the oil chamber 203a of the clutch actuator 203, so that the automatic clutch 2 returns to the coupled state (the state shown in FIG. 2). The travel distance (clutch stroke) of the piston rod 203b of the clutch actuator 203 is detected by a clutch stroke sensor 510. The output signal of the clutch stroke sensor 510 is input to the ECU 100.

—Shift Switch—

Figure 8:
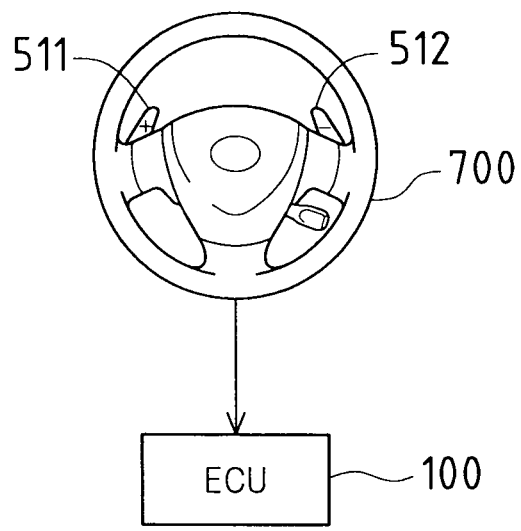
FIG. 8 is a diagram showing a steering wheel equipped with an up-shift switch and a down-shift switch.

In this embodiment, the speed change of the transmission 3 is carried out by a driver's handling of an up-shift switch 511 and a down-shift switch 512 shown in FIG. 8. The up-shift switch 511 and the down-shift switch 512 are disposed on a steering wheel 700. An operation signal of each of the up-shift switch 511 and the down-shift switch 512 is input to the ECU 100.

The up-shift switch 511 and the down-shift switch 512 each are a paddle switch (momentary switch (automatic return type switch)), for example. For one operation of the up-shift switch 511, the gear stage of the transmission 3 is shifted upward on a one-by-one basis (for example, 1st→2nd→3rd→ . . . →6th). Meanwhile, for one operation of the down-shift switch 512, the gear stage of the transmission 3 is shifted downward on a one-by-one basis (for example, 6th→5th→4th→ . . . →1st).

In this respect, in this embodiment, in addition to the shift switches 511 and 512, an automatic transmission mode switch (not shown) for selecting an automatic transmission mode is disposed on the steering wheel 700 or an instrument panel.

Figure 9:
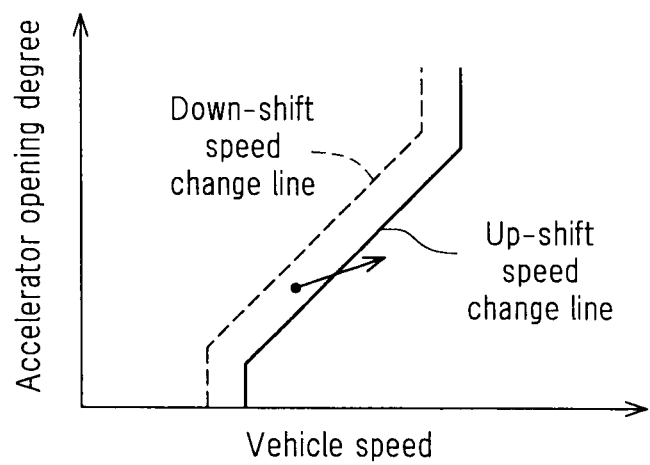
FIG. 9 shows a speed change map used when an automatic transmission mode is selected.

When the automatic transmission mode is selected by handling of the automatic transmission mode switch, the gear stage of the transmission 3 is set up automatically by the ECU 100 by referring to a speed change map shown in FIG. 9 based on the running conditions of a vehicle; for example, the vehicle speed and the accelerator opening.

For example, when the vehicle running conditions change with the pressing of the accelerator pedal to cause a crossing of an up-shift speed change line (solid line) shown in FIG. 9 (the case of a change indicated with an arrow in FIG. 9), this is determined as a request of an up-shift speed change, and an up-shift speed change is carried out by the transmission 3. In this respect, the vehicle speed can be calculated from the output signal of the output shaft revolution number sensor 504. While the speed change map in FIG. 9 shows only a single up-shift line (solid line) and a single down-shift speed change line (broken line), a plurality of up-shift speed change lines and a plurality of down-shift speed change lines are actually set corresponding to the gear stages (six stages at the forward side) of the transmission 3.

In this embodiment, in addition to the shift switches 511 and 512, a reverse switch, not shown, for selecting backward (reverse) is disposed. The reverse switch is disposed on, for example, an instrument panel or a console panel. Further, in addition to such a reverse switch, a neutral switch for selecting "Neutral" may be disposed as necessary, or "Neutral" may be set when the up-shift switch 511 and the down-shift switch 512 are operated simultaneously.

—ECU—

Figure 10:
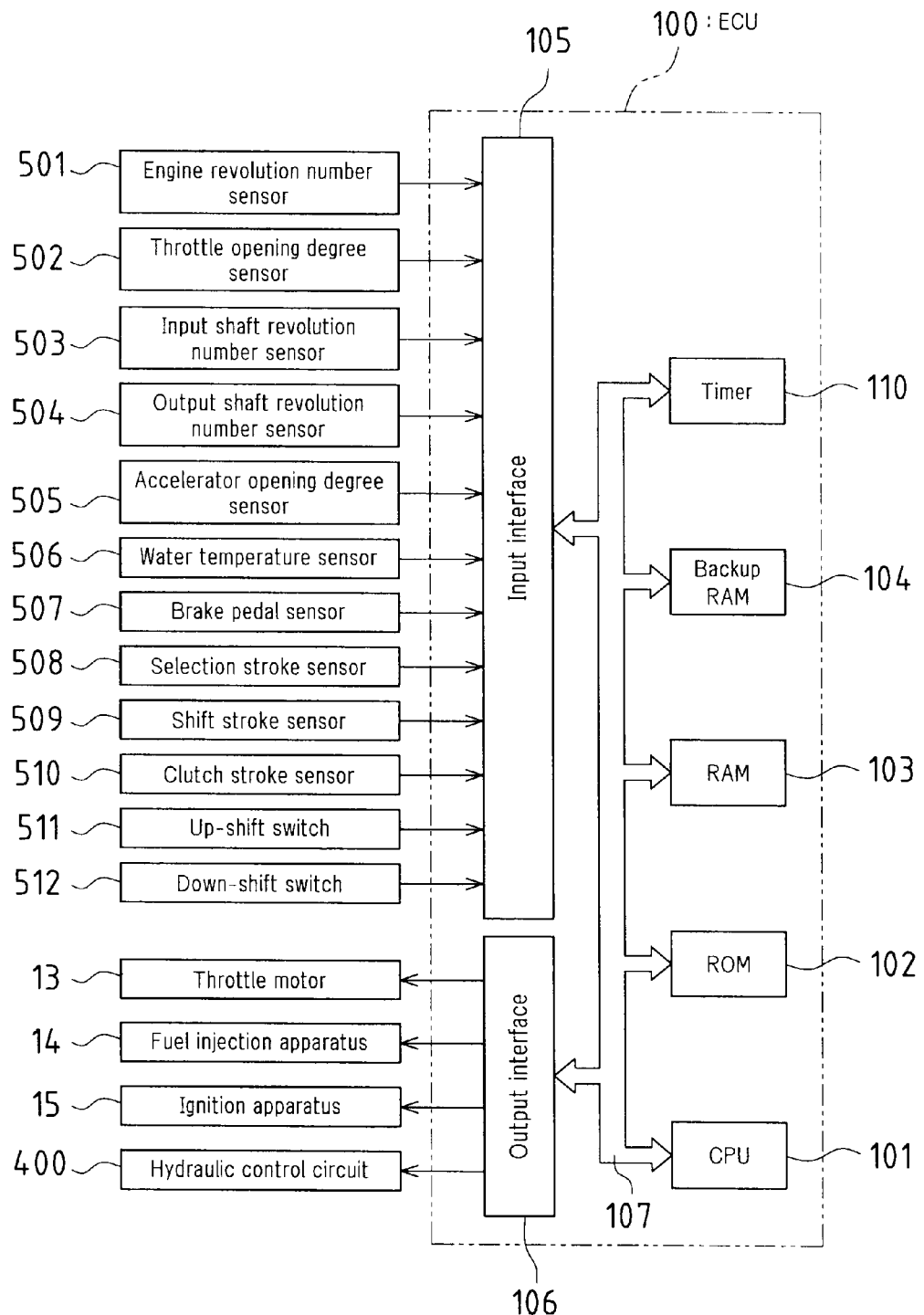
FIG. 10 is a block diagram showing a configuration of control system including an ECU.

As shown in FIG. 10, the ECU 100 includes a CPU 101, a ROM 102, a RAM 103, a backup RAM 104, and a timer 110.

The ROM 102 stores various control programs and maps to be referred to when the various control programs are executed. The CPU 101 executes arithmetic processing based on the various control programs and the maps stored in the ROM 102. Further, the RAM 103 is a memory that temporarily stores results of processing at the CPU 101 and data input from various sensors. The backup RAM 104 is a non-volatile memory that stores data to be saved at the time of stop of the engine 1. The timer 110 counts control time at the time of execution of various kinds of control for the engine 1.

The CPU 101, the ROM 102, the RAM 103, the backup RAM 104, and the timer 110 are connected to each other via a bus 107, and further connected to an input interface 105 and an output interface 106.

The input interface 105 of the ECU 100 is connected with the engine revolution number sensor 501, the throttle opening degree sensor 502, the input shaft revolution number sensor 503, the output shaft revolution number sensor 504, an accelerator opening degree sensor 505 that detects the amount of pressing of the accelerator pedal (accelerator opening), a water temperature sensor 506 that detects an engine water temperature (cooling water temperature), a brake pedal sensor 507, the selection stroke sensor 508, the shift stroke sensor 509, the clutch stroke sensor 510, the up-shift switch 511, and the down-shift switch 512. These sensors input signals into the ECU 100.

To the output interface 106 of the ECU 100, connected are a throttle motor 13 to open and close a throttle valve 12, a fuel injection apparatus 14, an ignition apparatus 15, and a hydraulic control circuit 400.

The ECU 100 executes various kinds of control of the engine 1, including the opening control of the throttle valve 12 of the engine 1, based on the output signals of the above-described various sensors. Moreover, at the time of a speed change of the transmission 3 and the like, based on the output signals of the above-described various sensors, the ECU 100 outputs a control signal (oil pressure designating value) to the hydraulic control circuit 400 so as to execute clutch operation control of coupling or decoupling the clutch 20, and outputs a control signal (oil pressure designating value) to the hydraulic control circuit 400 so as to execute shift control changing over the gear stage of the transmission 3. Furthermore, the ECU 100 executes the following "shift control at the time of up-shift speed change".

The speed changing control apparatus of a vehicle of the present invention is implemented by the programs executed by the ECU 100.

—Shift Control at the Time of Up-Shift Speed Change—

Figure 16:
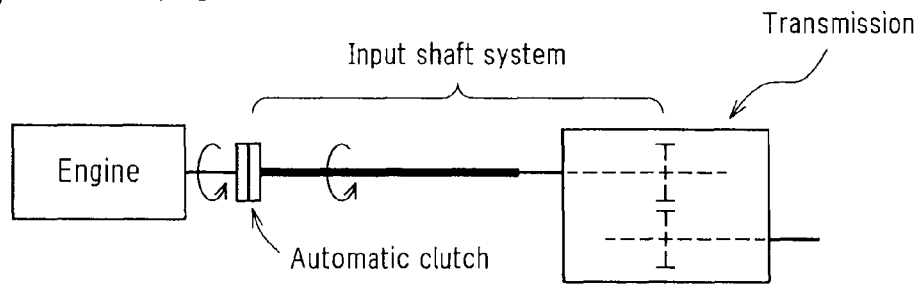
FIG. 16 shows diagrams illustrating a mechanism by which torsional vibration is generated.
Figure 16:
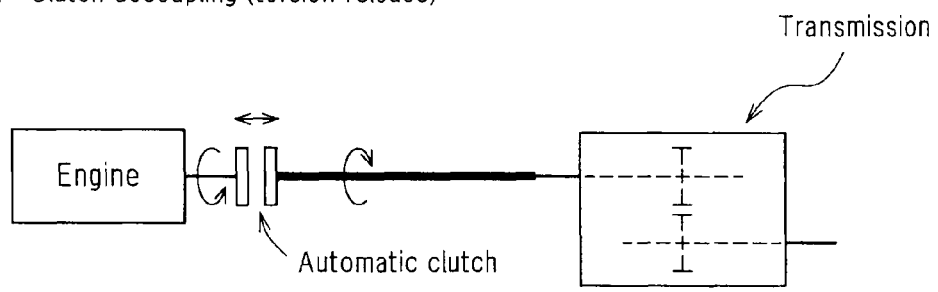
Figure 16:
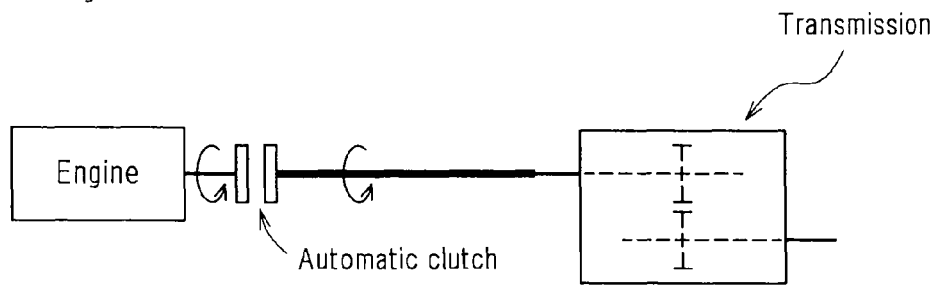
Figure 17:
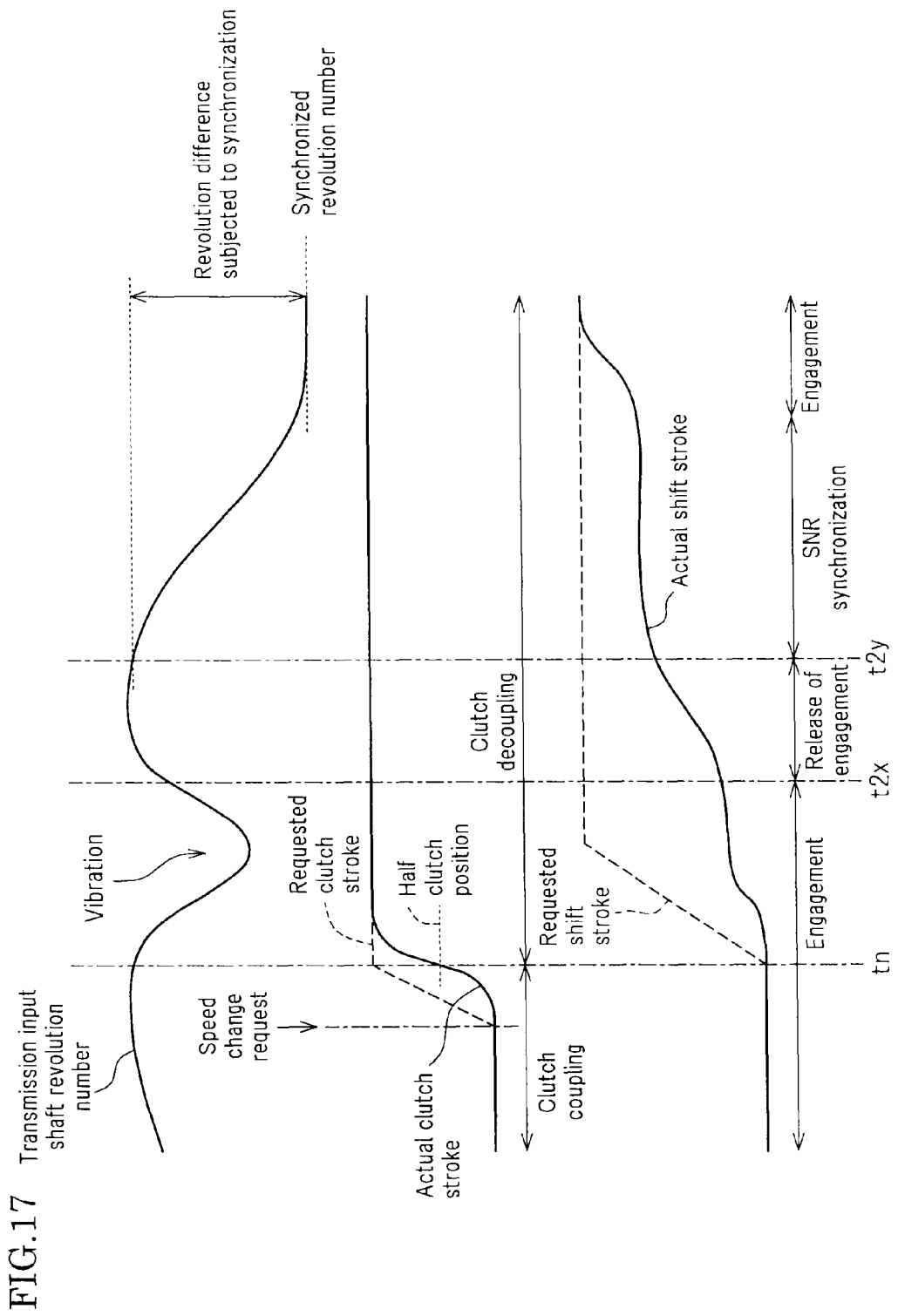
FIG. 17 is a timing chart showing an example of conventional shift control.

First, by referring to FIG. 16, description will be given to the mechanism by which torsional vibration is generated on the input shaft system of the transmission. The model in FIG. 16 shows an example in which a torque tube is disposed in the input system between the automatic clutch and the input shaft of the transmission.

As shown in FIG. 16(A), when the automatic clutch is in the coupled state, the output shaft revolution number of the engine is the same as the input shaft revolution number of the transmission. Next, if the automatic clutch 2 is quickly decoupled in an attempt to implement an up-shift speed change, drive system components, such as a torque tube, that have been twisted so far through running are rapidly released from torsion, and then, as shown in FIG. 16(B), the input shaft system of the transmission is twisted in the reverse direction. Further, due to the swing-back of the torsion, as shown in FIG. 16(C), the input shaft system of the transmission is twisted in the reverse direction to that in FIG. 16(B).

Thus, torsional vibration is generated when the release of torsion on the input shaft system due to decoupling of the clutch during up-shift speed change and the swing-back of the torsion are repeated alternately. As described above, if such torsional vibration is generated, the input shaft revolution number of the transmission is high at the time of start of synchronization by the synchronizer ring. Accordingly, the revolution difference (revolution difference subjected to synchronization) with a synchronized revolution number after the speed change increases. This situation elongates the time necessary for revolution synchronization, and increases the workload of the synchronizer ring. Accordingly, there is a possibility that abrasion and deterioration of the synchronizer ring improve.

In order to solve above problems, in this embodiment, the shift disengaging operation is controlled in such a manner that when the torque on the input shaft side of the transmission 3 balances with the torque on the output shaft side of the transmission 3 for the first time after an up-shift speed change is requested, the transmission 3 is turned into a shift engagement state, thereby suppressing torsional vibration. The revolution synchronization is carried out with the output shaft revolution number of the transmission in a lowered state. The control (shift control) will be described in detail.

[Shift Control (1)]

Figure 11:
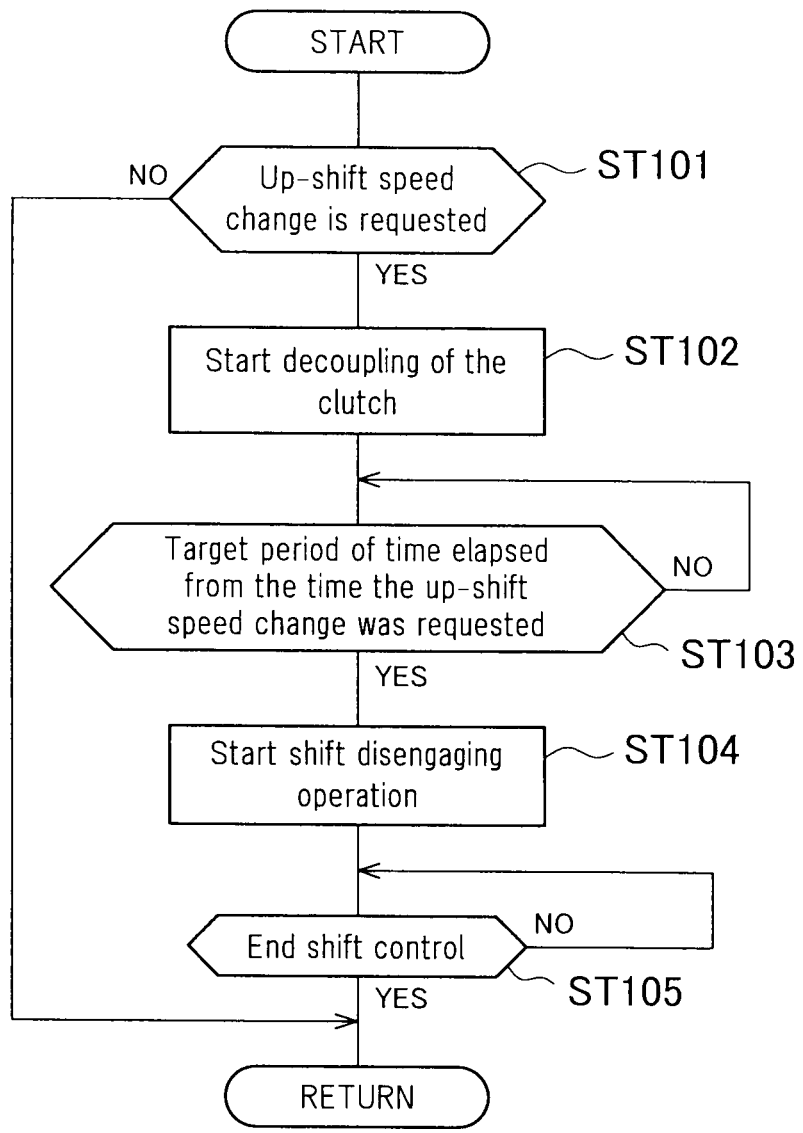
FIG. 11 is a flowchart showing an example of shift control at the time of an up-shift speed change.

An example of the shift control at the time of an up-shift speed change will be described by referring to a flowchart shown in FIG. 11 and a timing chart shown in FIG. 12. The control routine shown in FIG. 11 is repeated in the ECU 100 at predetermined intervals (of, for example, some milliseconds to some tens of milliseconds). This embodiment shows an example of shift control of quick operation of the automatic clutch 2 such as during acceleration.

First, at step ST101, whether an up-shift speed change is requested by handling of the up-shift switch 511 is determined. When the determination result at step ST101 is an affirmative determination, the timer 110 starts counting an elapsed period of time Ta from a time t11 (FIG. 12) of request of the up-shift speed change, and the shift control proceeds to step ST102. When the automatic shift mode is selected, an up-shift speed change is determined to be requested when the vehicle running conditions change with a pressing operation (acceleration request) of the accelerator pedal to cause a crossing of the up-shift speed change line (solid line) in the speed change map shown in FIG. 9. Then, similarly, counting of an elapsed period of time Ta starts, and the shift control proceeds to step ST102. When the determination result at step ST101 is a negative determination, the shift control returns.

At step ST102, decoupling of the automatic clutch 2 (hereafter also referred to as "decoupling of clutch") starts. Specifically, as shown in FIG. 12, the ECU 100 outputs a requested clutch stroke to the hydraulic control circuit 400, and then the hydraulic control circuit 400 controls the actuation of the clutch actuator 203 in accordance with the requested clutch stroke. The actual clutch stroke (solid line) has a delay in response relative to the requested clutch stroke (broken line).

At step ST103, a determination is made as to whether a target period of time Tt (detailed later) elapses from a point of time (timing t11 in FIG. 12) when the up-shift speed change was requested. Then, when the determination result is an affirmative result (when the elapsed period of time Ta reaches the target period of time Tt), a shift disengaging operation starts (step ST104).

Specifically, for example, in FIG. 3, when the internal teeth 322 of the sleeve 320 of the synchromesh mechanism 300 are meshed with the external teeth 311d of the gear 311b of the gear pair 311 shown in FIG. 1, then the shift actuator 302 carries out shift disengagement to shift the sleeve 320 in the X direction. After the shift disengagement, with the shift of the sleeve 320 in the X direction, shift engagement (gear engagement) is carried out for the gear pair 312 shown in FIG. 1. Subsequently, upon engagement of the sleeve 320 with the gear 312b at the up-shift speed change side (see FIG. 4) (when the determination result at step ST105 is an affirmative determination), the shift control (speed change control) ends.

The shift control will be described by referring to the timing chart shown in FIG. 12.

First, in this embodiment, a shift request (requested shift stroke) is output to the hydraulic control circuit 400 so as to start a shift disengaging operation after an up-shift speed change is requested and at timing t12 (at a point of time when the target period of time Tt elapses) before a point of time to when the actual clutch stroke of the automatic clutch 2 reaches a half clutch position (clutch-decoupled state). Accordingly, before the automatic clutch 2 turns into the clutch-decoupled state (the actual clutch stroke reaches the half clutch position), a force in the shift disengaging direction (for example, in the X direction in FIG. 3) is applied to the sleeve 320 of the synchromesh mechanism 300.

Figure 15:
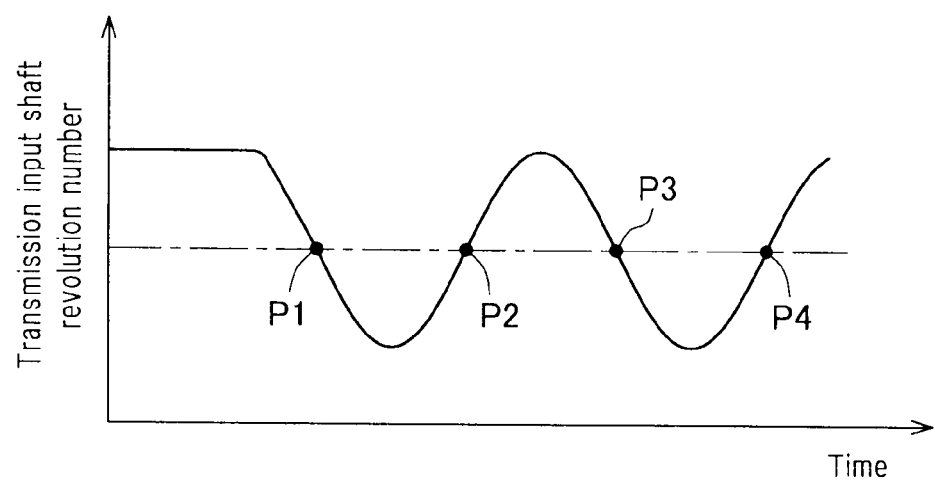
FIG. 15 is a waveform diagram of torsional vibration.

This ensures that the sleeve 320 of the synchromesh mechanism 300 shown in FIG. 3 is disengaged naturally (the engagement between the internal teeth 322 of the sleeve 320 and the external teeth 311d of the gear 311b is released naturally) when the torque on the input shaft side of the transmission 3 balances with the torque on the output shaft side of the transmission 3 for the first time after the up-shift speed change is requested, that is, at point P1 shown in FIG. 15, which is when the force of the torsional vibration is smallest. Thus, establishing the shift disengagement state at point P1 (immediately after releasing of torsion) turns both end portions of the input shaft system of the transmission 3 into free ends, thereby suppressing torsional vibration. Accordingly, the input shaft revolution number of the transmission 3 decreases due to dragging and approaches the synchronized revolution number after the speed change.

Next, the actual shift stroke (the shift of the sleeve 320 in the X direction) advances, and the synchronizer ring 330 starts the revolution synchronization (SNR synchronization) from a point of time t1y when the cone-shaped surface 331 of the synchronizer ring 330 shown in FIG. 3 comes into contact with the cone-shaped surface 312c of the gear 312b. In this respect, since the input shaft revolution number of the transmission 3 is decreased, the revolution difference (revolution difference subjected to synchronization) between the input shaft revolution number of the transmission 3 and the synchronized revolution number after the speed change can be diminished.

When the revolution synchronization by the synchronizer ring 330 completes, and the actual shift stroke further advances to reach the requested shift stroke, then as shown in FIG. 4 and FIG. 5(D), each of the internal teeth 322 of the inner circumference spline 321 of the sleeve 320 enters between the external teeth 312d of the gear 312b shown in FIG. 1 (the internal teeth 322 of the sleeve 320 are meshed with the external teeth 312d of the gear 312b). This connects the gear 312b to the output shaft 32, which turns the gear pair 312 (FIG. 1) into a power transmitting state, thus completing the speed change (gear engagement).

Thus, according to the shift control of this embodiment, the synchronizer ring 330 carries out revolution synchronization after the input shaft revolution number of the transmission 3 is lowered by utilizing the fluctuation in revolution that occurs at the time of decoupling of the clutch. This diminishes the revolution difference subjected to synchronization, and shortens the time (time for a speed change) necessary for revolution synchronization. This shortens the time for a speed change. Further, the workload of the synchronizer ring 330 per speed change is reduced, which in turn reduces abrasion and deterioration of the synchronizer ring 330.

In the shift control, the target period of time Tt used for the determination processing at step ST103 is set at a suitable value by experiment and calculation in advance, in expectation of variation in responsiveness of shift control and machine-to-machine variations, such that even in a situation that the variations would become largest, a shift disengaging force securely acts on the sleeve 320 of the synchromesh mechanism 300 at a time when the input shaft revolution number reaches point P1 shown in FIG. 15. Further, the period of time between the point of time of request of the up-shift speed change and reaching of point P1 varies among the gear stages (1st through 6th) of the transmission 3. In view of this, the target period of time Tt is set at a suitable value for each gear stage. The suitable values of the target period of time Tt are stored in the ROM 102 of the ECU 100.

Figure 12:
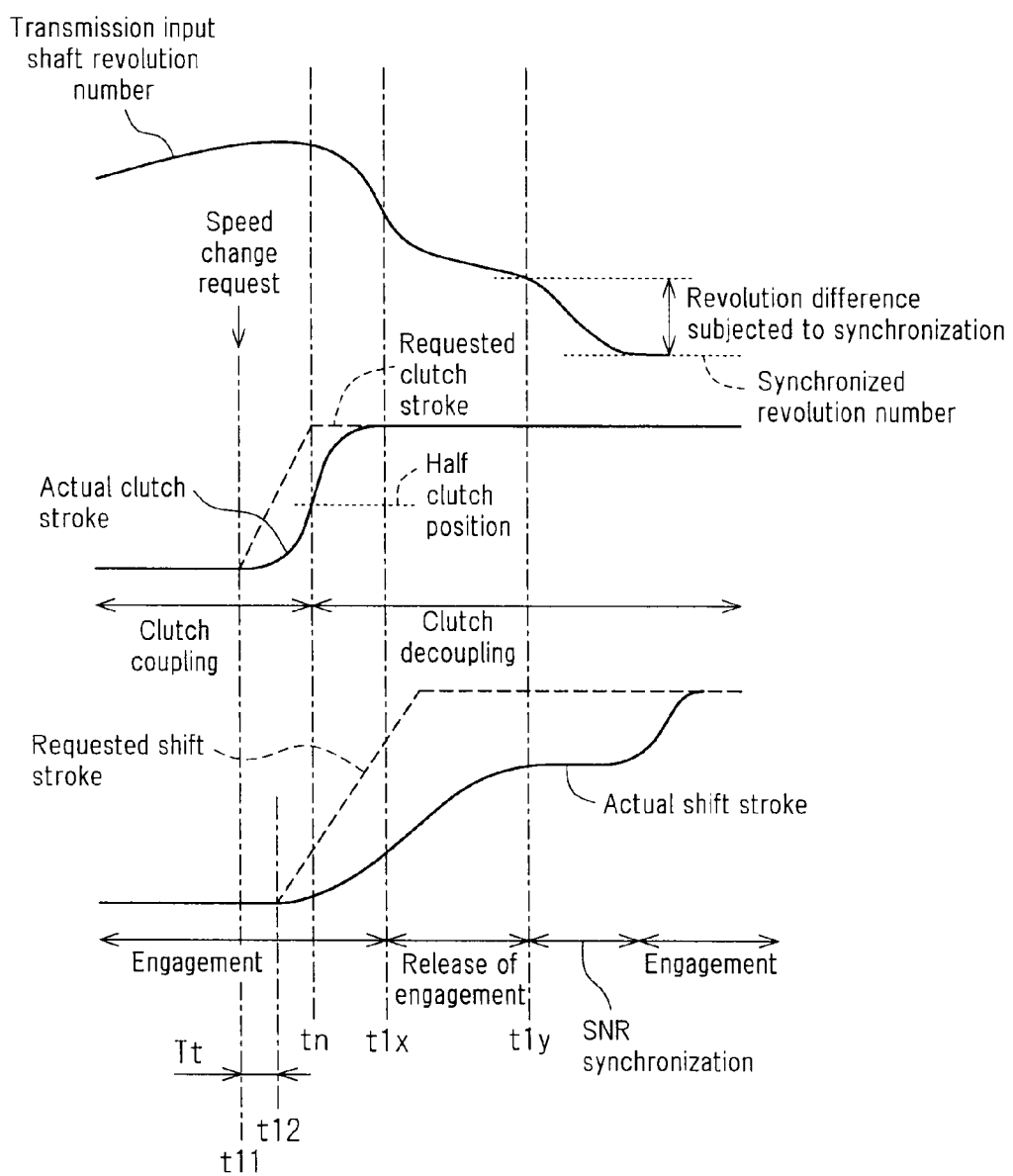
FIG. 12 is a timing chart showing an example of shift control at the time of an up-shift speed change.

While in the above embodiment the case of up-shift speed change from the gear pair 311 to the gear pair 312 is exemplified, up-shift speed changes for other gear pairs may be carried out with similar shift control to that in FIG. 11 and FIG. 12. Further, even when a synchromesh mechanism of a gear pair after an up-shift speed change differs from a synchromesh mechanism of a gear pair before the up-shift speed change, the operation is basically the same as that shown in FIG. 12 except that the shift stroke of the shift actuator 302 is stopped once at the neutral position at the time of shift fork shaft selection. Accordingly, also in this case, similar shift control to that shown in FIG. 11 and FIG. 12 may be carried out.

[Shift Control (2)]

While in above-described [Shift Control (1)] the shift disengaging operation starts at t12, which is the point of elapse of the target period of time Tt from a point of time t11 when the speed change is requested, this should not be construed in a limiting sense. It is also possible to control the start of shift disengaging operation using an actual clutch stroke obtained from the output signal of the clutch stroke sensor 310 and a target clutch stroke position.

Figure 13:
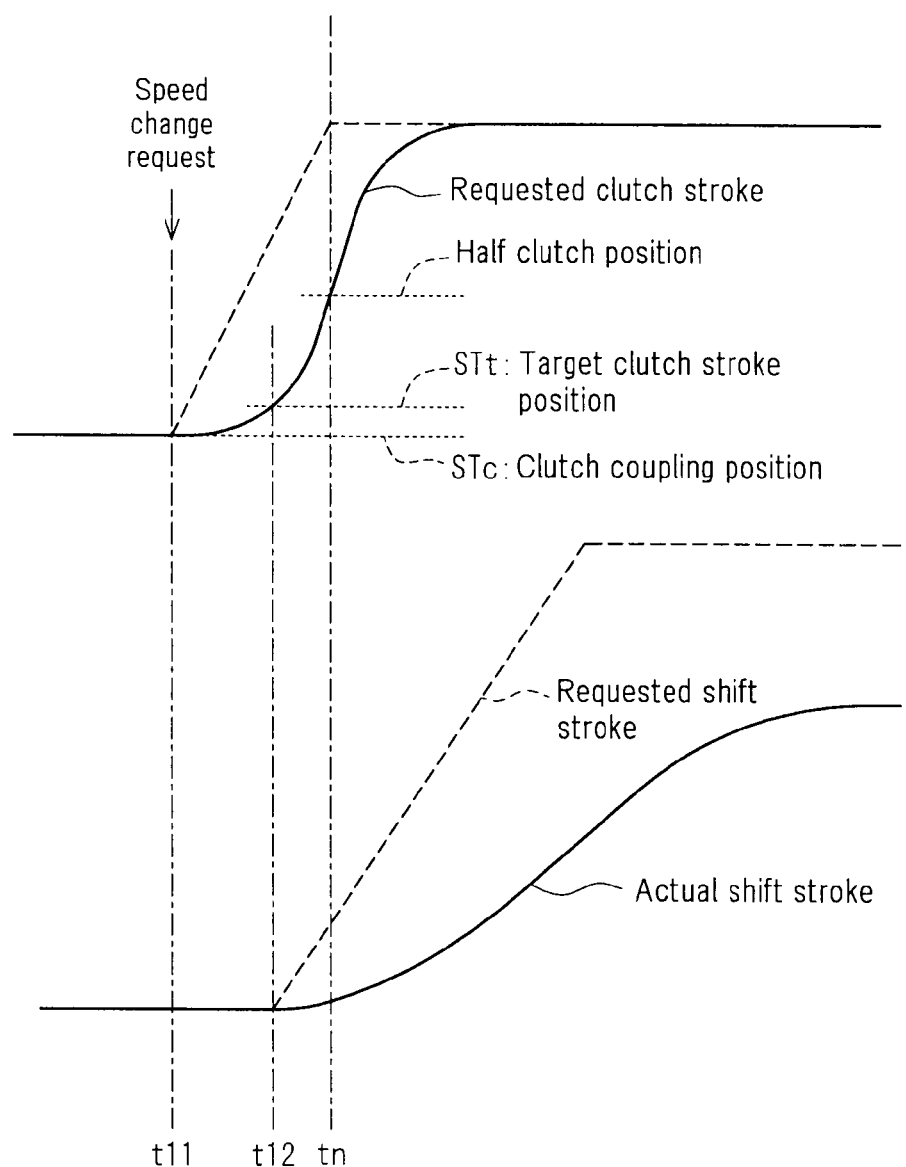
FIG. 13 is a timing chart showing another example of shift control at the time of an up-shift speed change.

Specifically, the shift disengaging operation starts to apply a force on the sleeve 320 of the synchromesh mechanism 300 in the shift disengaging direction at a point of time t12 when the actual clutch stroke of the automatic clutch 2 reaches the target clutch stroke position STt, which is after an up-shift speed change is requested and before the automatic clutch 2 turns into the clutch-decoupled state (the actual clutch stroke reaches the half clutch position), as shown in the timing chart of FIG. 13.

This ensures that the sleeve 320 of the synchromesh mechanism 300 is disengaged naturally when the torque on the input shaft side of the transmission 3 balances with the torque on the output shaft side of the transmission 3 for the first time after the up-shift speed change is requested, that is, at point P1 (immediately after releasing of torsion) shown in FIG. 15, which is when the force of the torsional vibration is smallest. This, also in this embodiment, suppresses the torsional vibration at the time of decoupling of the clutch. This in turn diminishes the revolution difference subjected to synchronization, and shortens the time (time for a speed change) necessary for revolution synchronization, similarly to [Shift Control (1)]. As a result, the time for a speed change is shortened. Further, the workload of the synchronizer ring 300 per speed change is reduced, which in turn reduces abrasion and deterioration of the synchronizer ring 300.

In this respect, the target clutch stroke position STt used in this embodiment is set at a position closer to the clutch-coupled position STc than to the half clutch position of the automatic clutch 2, as shown in FIG. 13. The target clutch stroke position STt is set at a suitable value by experiment and calculation in advance, in expectation of variation in responsiveness of shift control and machine-to-machine variations, such that even in a situation that the variations would become largest, a shift disengaging force securely acts on the sleeve 320 of the synchromesh mechanism 300 when the input shaft revolution number reaches point P1 shown in FIG. 15. Further, the period of time between the point of time of request of the up-shift speed change with the automatic clutch 2 at the coupled position and reaching of point P1 varies among the gear stages (1st through 6th) of the transmission 3. In view of this, the target clutch stroke position STt is set at a suitable value for each gear stage.

Moreover, in controlling the start of the shift disengaging operation using the target clutch stroke position STt, it is possible to calculate a period of time during which the actual clutch stroke of the automatic clutch 2 reaches the target position STt based on the amount of change in the actual clutch stroke of the automatic clutch 2 after the up-shift speed change is requested, and then to start the shift disengaging operation upon elapse of the calculated period of time. One example will be described below by referring to FIG. 14.

Figure 14:
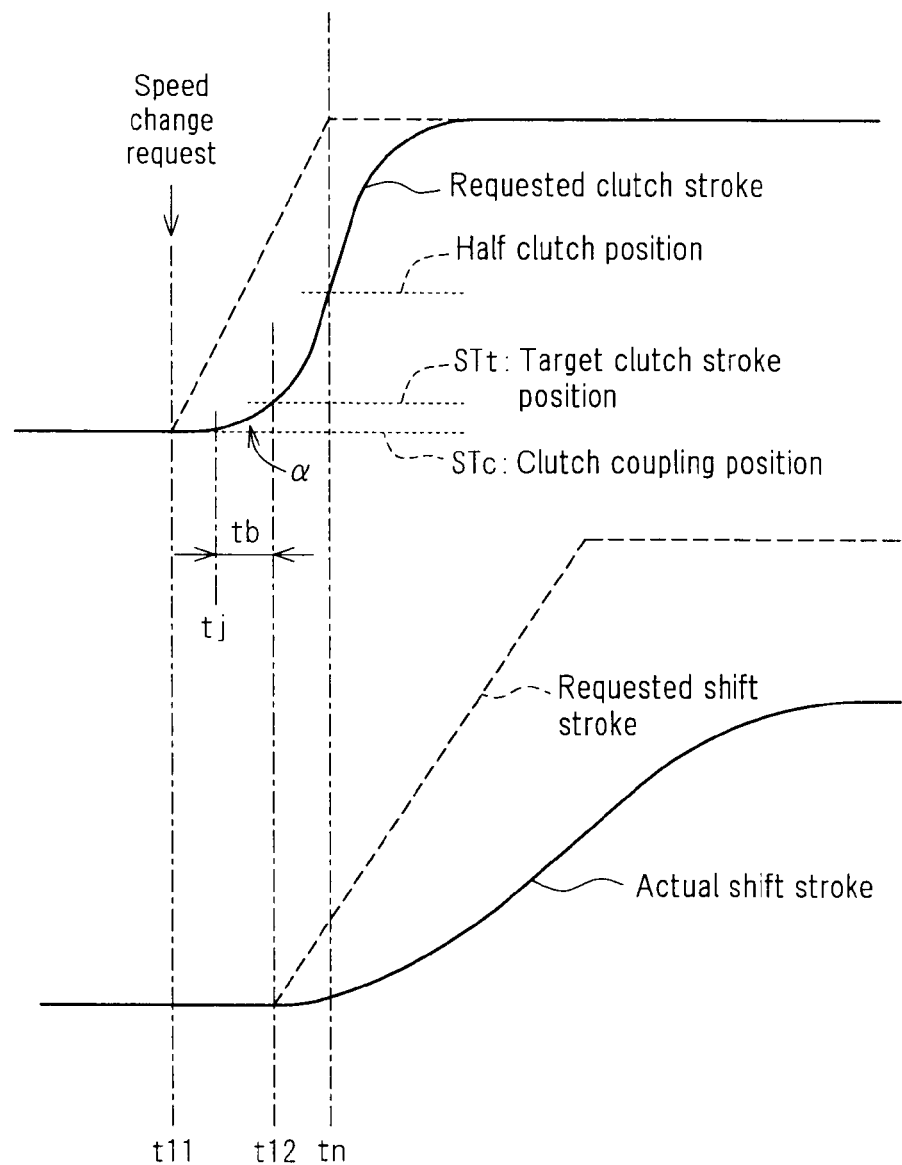
FIG. 14 is a timing chart showing another example of shift control at the time of an up-shift speed change.

(1) Calculate the amount of change per unit time in the actual clutch stroke (a change slope of the actual clutch stroke at an α portion of FIG. 14) based on the output signal of the clutch stroke sensor 510.

(2) Calculate a period of time tb during which the actual clutch stroke reaches the target clutch stroke position STt based on the calculated amount of change per unit time in the actual clutch stroke (tb=[|target position STt−clutch-coupled position STc (FIG. 14)|/amount of change in the actual clutch stroke]).

(3) Determine whether the period of time tb calculated at (2) elapsed from a point of time tj when the actual clutch stroke changes, and start the shift disengaging operation when the determination result is an affirmative determination (when the elapsed period of time from the point of time tj reaches the calculated period of time tb).

This case diminishes the revolution difference subjected to synchronization, and shortens the time (time for a speed change) necessary for revolution synchronization, similarly to [Shift Control (1)] and [Shift Control (2)]. This in turn shortens the time for a speed change. Further, the workload of the synchronizer ring 330 per speed change is reduced, which in turn reduces abrasion and deterioration of the synchronizer ring 330.

At the time of a down-shift speed change, it is possible to carry out similar shift control to that at the time of an up-shift speed change, if there is a possibility of torsional vibration as shown in FIG. 15.

OTHER EMBODIMENTS

While in the above embodiments an actuator using oil pressure as a driving power source is employed for each of the selection actuator 301 and the shift actuator 302, this should not be construed in a limiting sense. It is also possible to use an electric actuator that uses an electric motor as a driving power source. Further, an electric actuator may be used also for the clutch actuator 203.

While in the above embodiments the present invention is applied to shift control of a transmission with six shift stages at the forward side, this should not be construed in a limiting sense. For example, the present invention can be applied to shift control of transmissions with any other number of shift stages (automated manual transmission), such as a transmission with five shift stages at the forward side.

While in the above embodiments the present invention is applied to shift control of a vehicle on which only the engine (internal combustion engine) is mounted as a driving power source, this should not be construed in a limiting sense. For example, the present invention can be applied to shift control of hybrid vehicles on which an engine (internal combustion engine) and a motor (e.g., running motor and generator motor) are mounted as driving power sources.

INDUSTRIAL APPLICABILITY

The present invention finds applications in speed changing control apparatuses of vehicles. More specifically, the present invention can be used for a speed changing control apparatus of a vehicle that includes a driving power source (such as engine) to generate driving power for running; a transmission that includes a synchromesh mechanism to synchronize an input shaft revolution number with an output shaft revolution number and an actuator to automatically carry out a shift operation; and an automatic clutch disposed along a driving power transmitting passage between the driving power source and the transmission.

The invention claimed is:

1. A speed changing control apparatus for use in a vehicle, the vehicle including a driving power source configured to generate driving power for running; a transmission having a synchromesh mechanism configured to synchronize an input shaft revolution number with an output shaft revolution number and an actuator configured to automatically carry out a shift operation; and an automatic clutch disposed along a driving power transmitting passage between the driving power source and the transmission, the speed changing control apparatus comprising:

a shift control unit that starts a shift disengaging operation for the transmission after a speed change is requested and before the automatic clutch turns into a decoupled state, the speed changing control apparatus being configured to cause the synchromesh mechanism to carry out revolution synchronization after the shift disengagement ends with the input shaft revolution number of the transmission in a lowered state, wherein the shift control unit comprises an actual stroke detecting unit that detects a clutch stroke of the automatic clutch, and is configured to start the shift disengaging operation for the transmission upon an actual clutch stroke of the automatic clutch reaching a target position after the speed change is requested and before the automatic clutch turns into a decoupled state.

2. The speed changing control apparatus for use in a vehicle according to claim 1, wherein the shift control unit is configured to control the shift disengaging operation for the transmission such that the transmission turns into a shift disengagement state when an input shaft side torque of the transmission balances with an output shaft side torque of the transmission for a first time after the speed change is requested.

3. The speed changing control apparatus for use in a vehicle according to claim 1, wherein the shift control unit is configured to start the shift disengaging operation for the transmission upon elapse of a target period of time from a point of time when the speed change is requested.

4. The speed changing control apparatus for use in a vehicle according to claim 1, wherein the shift control unit is configured to calculate a period of time during which the actual clutch stroke of the automatic clutch reaches the target position, based on an amount of change in the clutch stroke of the automatic clutch after the speed change is requested, and configured to start the shift disengaging operation upon elapse of the calculated period of time.

5. The speed changing control apparatus for use in a vehicle according to claim 2, wherein the shift control unit is configured to start the shift disengaging operation for the transmission upon elapse of a target period of time from a point of time when the speed change is requested.

* * * * *